(12) United States Patent
Nakagawa et al.

(10) Patent No.: US 9,444,573 B2
(45) Date of Patent: Sep. 13, 2016

(54) TRANSMISSION DEVICE AND OPTICAL TRANSMISSION SYSTEM

(71) Applicant: FUJITSU LIMITED, Kawasaki-shi, Kanagawa (JP)

(72) Inventors: Goji Nakagawa, Sagamihara (JP); Shoichiro Oda, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/658,750

(22) Filed: Mar. 16, 2015

(65) Prior Publication Data
US 2015/0280852 A1 Oct. 1, 2015

(30) Foreign Application Priority Data
Mar. 31, 2014 (JP) ................................. 2014-072381

(51) Int. Cl.
*H04J 14/02* (2006.01)
*H04Q 11/00* (2006.01)
*H04B 10/67* (2013.01)

(52) U.S. Cl.
CPC ......... *H04J 14/0221* (2013.01); *H04B 10/675* (2013.01); *H04J 14/0212* (2013.01); *H04J 14/0258* (2013.01); *H04Q 11/0066* (2013.01); *H04Q 2011/0009* (2013.01); *H04Q 2011/0016* (2013.01); *H04Q 2011/0083* (2013.01)

(58) Field of Classification Search
CPC ............ H04B 10/506; H04B 10/0775; H04B 10/0795; H04B 10/675; H04B 1/30; H04B 2203/5491; H04B 2210/074; H04B 10/077; H04B 10/07957; H04J 14/0212; H04J 14/0221; H04J 14/0258; H04J 14/0257; H04J 14/0201; H04J 14/021; H04J 14/0276; H04L 27/3809; H04Q 2011/0009; H04Q 11/0066; H04Q 2011/0016; H04Q 2011/0083
USPC ...................... 398/34, 85, 84, 93, 94, 95, 38
See application file for complete search history.

(56) References Cited

U.S. PATENT DOCUMENTS

| | | | | |
|---|---|---|---|---|
| 5,469,288 A | * | 11/1995 | Onaka | H04J 14/02 372/92 |
| 5,521,754 A | * | 5/1996 | Nitta | H04B 10/2931 359/344 |
| 5,696,859 A | * | 12/1997 | Onaka | G02B 6/12007 372/20 |
| 6,160,931 A | * | 12/2000 | Asakura | G02B 6/022 385/24 |

(Continued)

FOREIGN PATENT DOCUMENTS

| | | |
|---|---|---|
| EP | 2541821 | 1/2013 |
| EP | 2760147 | 7/2014 |

(Continued)

OTHER PUBLICATIONS

EESR—Extended European Search Report dated Oct. 5, 2015 issued in the corresponding European Patent Application No. 15158994.2.

*Primary Examiner* — Hibret Woldekidan
(74) *Attorney, Agent, or Firm* — Fujitsu Patent Center

(57) ABSTRACT

A transmission device that receives an optical signal on which a frequency modulated signal is superimposed includes: an optical filter configured to filter the optical signal; a filter controller configured to control a passband of the optical filter based on a change of power of the optical signal; and a signal detection unit configured to detect the frequency modulated signal based on the change of the power of the optical signal filtered by the optical filter.

6 Claims, 18 Drawing Sheets

(56) References Cited

U.S. PATENT DOCUMENTS

| | | | |
|---|---|---|---|
| 7,171,185 B2* | 1/2007 | Matsumoto | H03G 3/3068 375/345 |
| 8,036,538 B2* | 10/2011 | Wang | H04B 10/0771 359/337 |
| 8,078,054 B2* | 12/2011 | Jiang | H04J 14/0221 398/32 |
| 8,693,874 B2* | 4/2014 | Suzuki | H04B 10/2942 359/341.1 |
| 8,891,565 B2* | 11/2014 | Kakui | H01S 3/2308 372/25 |
| 9,071,378 B2* | 6/2015 | Hoshida | H04J 14/02 |
| 9,143,242 B2* | 9/2015 | Nakagawa | H04B 10/60 |
| 9,281,913 B2* | 3/2016 | Hironishi | H04J 14/0201 |
| 9,350,479 B2* | 5/2016 | Sone | H04J 14/0212 |
| 2003/0223751 A1* | 12/2003 | Shimizu | H04J 14/0221 398/79 |
| 2004/0208428 A1* | 10/2004 | Kikuchi | G02B 6/29358 385/24 |
| 2006/0215955 A1* | 9/2006 | Mitamura | G02B 6/2931 385/18 |
| 2008/0240725 A1 | 10/2008 | Yokoyama | |
| 2009/0196603 A1* | 8/2009 | Zhou | H04B 10/0773 398/32 |
| 2010/0166425 A1* | 7/2010 | Onaka | H04J 14/0221 398/79 |
| 2010/0322633 A1* | 12/2010 | Suzuki | H04B 10/2942 398/93 |
| 2011/0081146 A1* | 4/2011 | Nakajima | H04J 14/0204 398/48 |
| 2011/0311222 A1* | 12/2011 | Nakamura | H04B 10/07953 398/26 |
| 2012/0328297 A1* | 12/2012 | Hoshida | H04J 14/02 398/85 |
| 2014/0219662 A1* | 8/2014 | Hironishi | H04J 14/0201 398/79 |
| 2015/0155934 A1* | 6/2015 | Nakagawa | H04B 10/0775 398/34 |

FOREIGN PATENT DOCUMENTS

| | | | |
|---|---|---|---|
| EP | 2779487 | 9/2014 | |
| EP | 2879311 | 6/2015 | |
| JP | 2004-70130 | 3/2004 | |
| JP | EP 2779487 A1 * | 9/2014 | H04B 10/60 |

\* cited by examiner

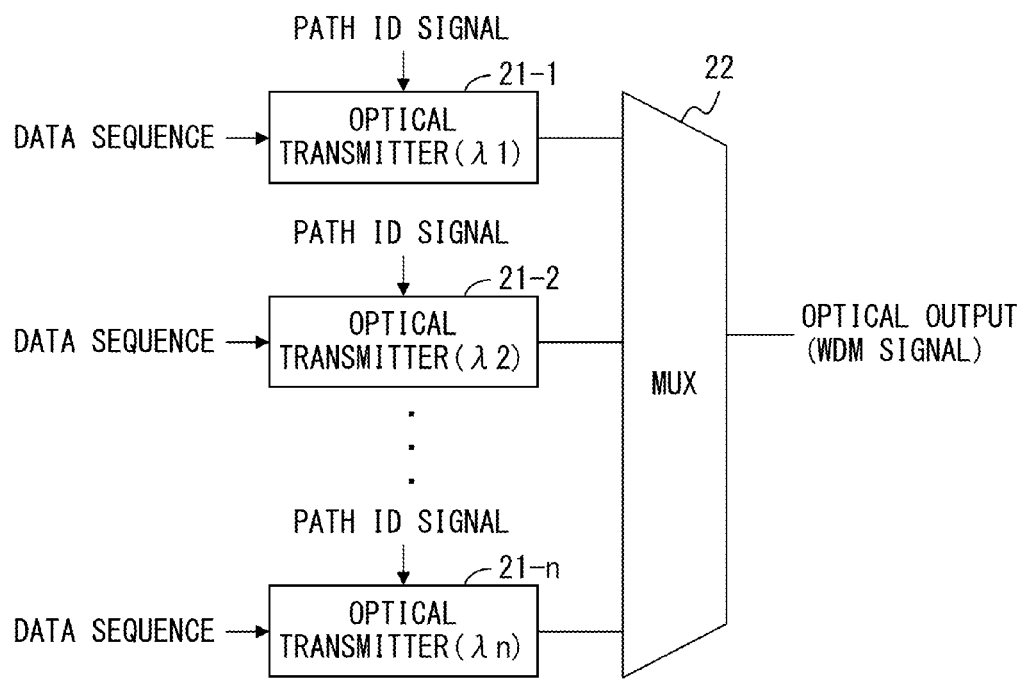
F I G. 2

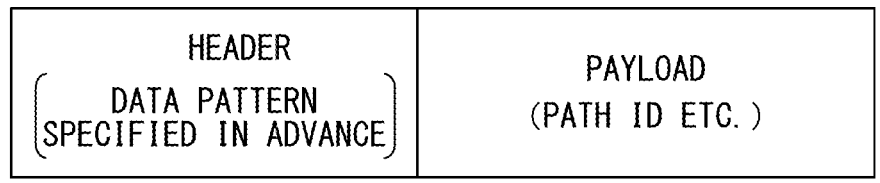
F I G. 3

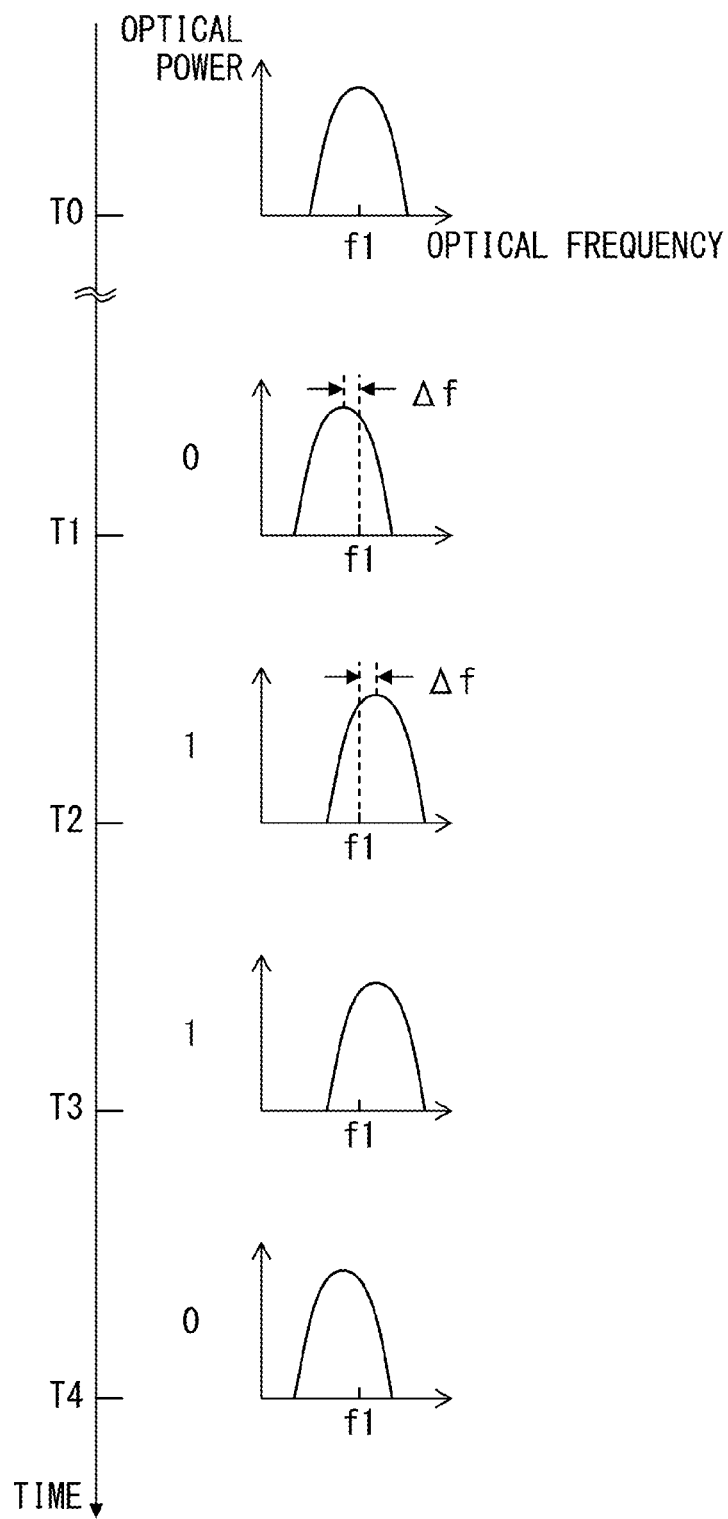
F I G. 5

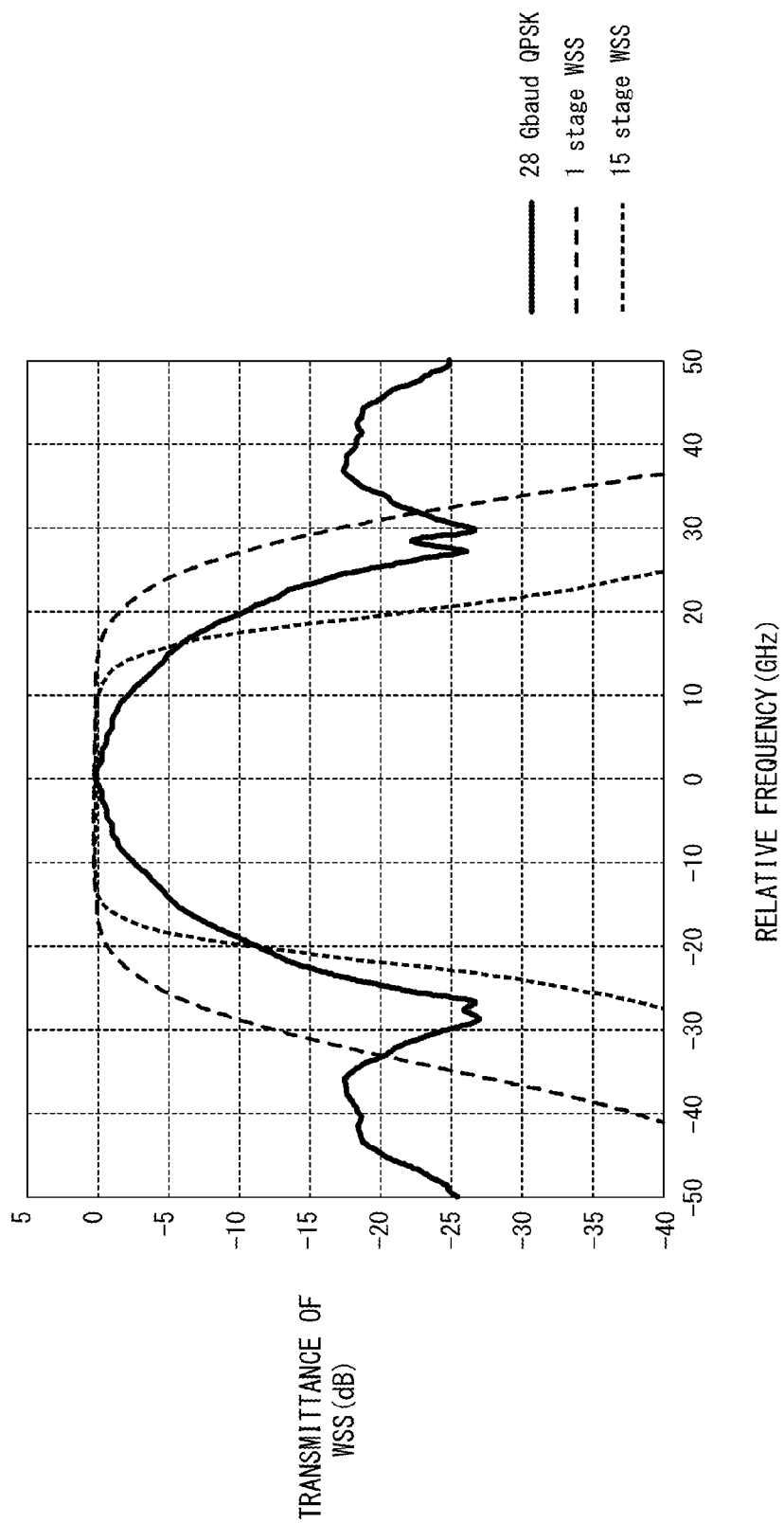
F I G. 7

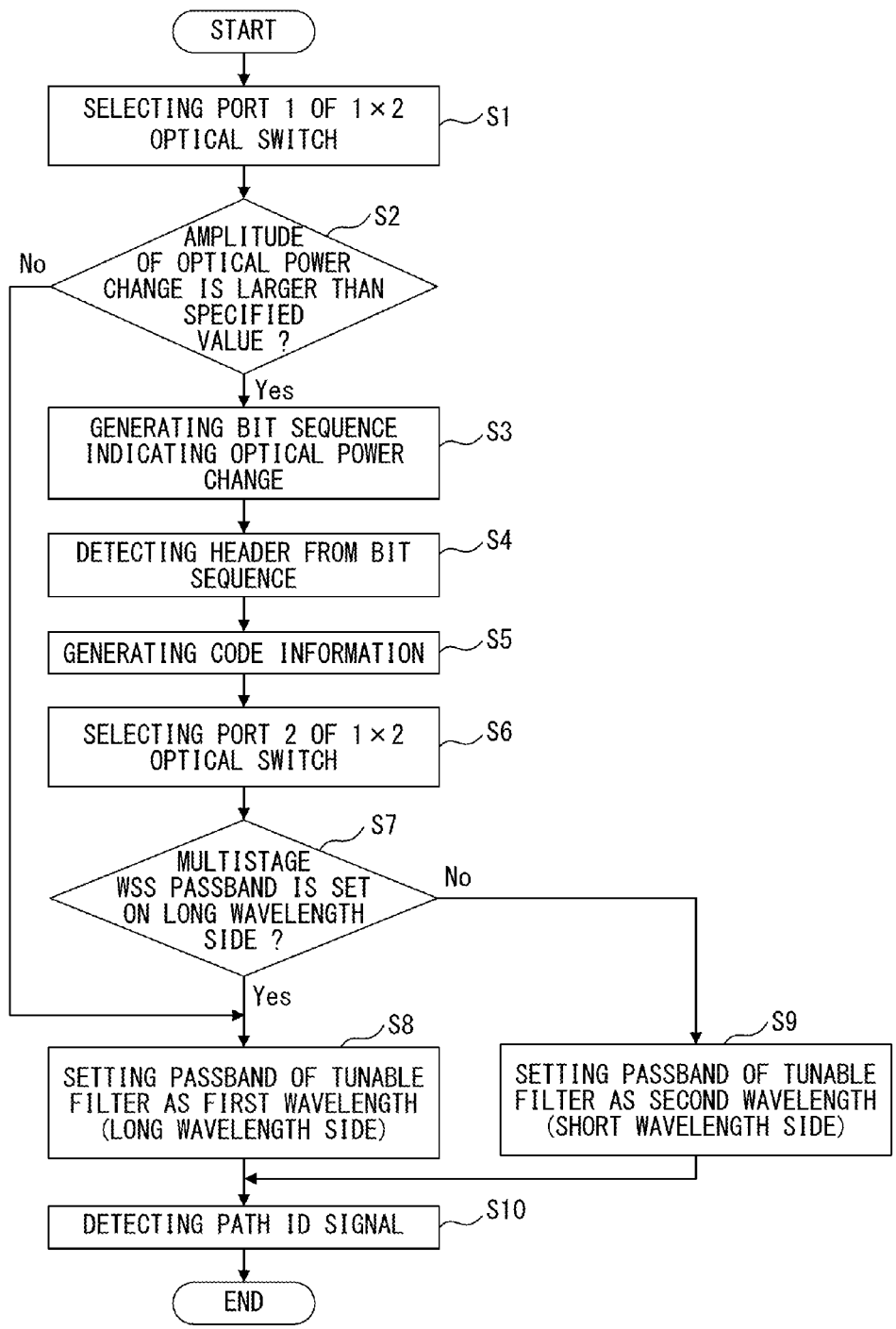
F I G. 11

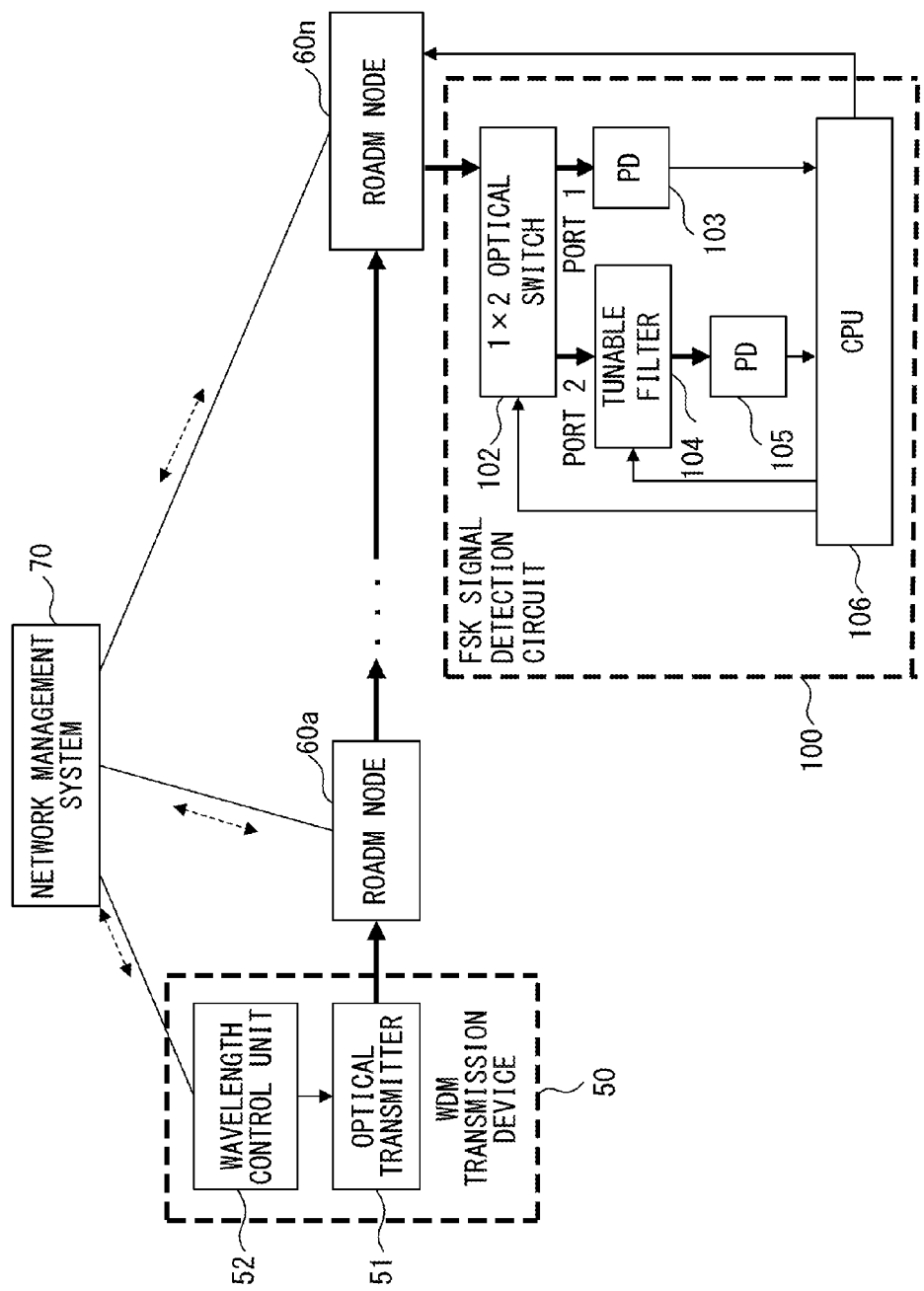
F I G. 15

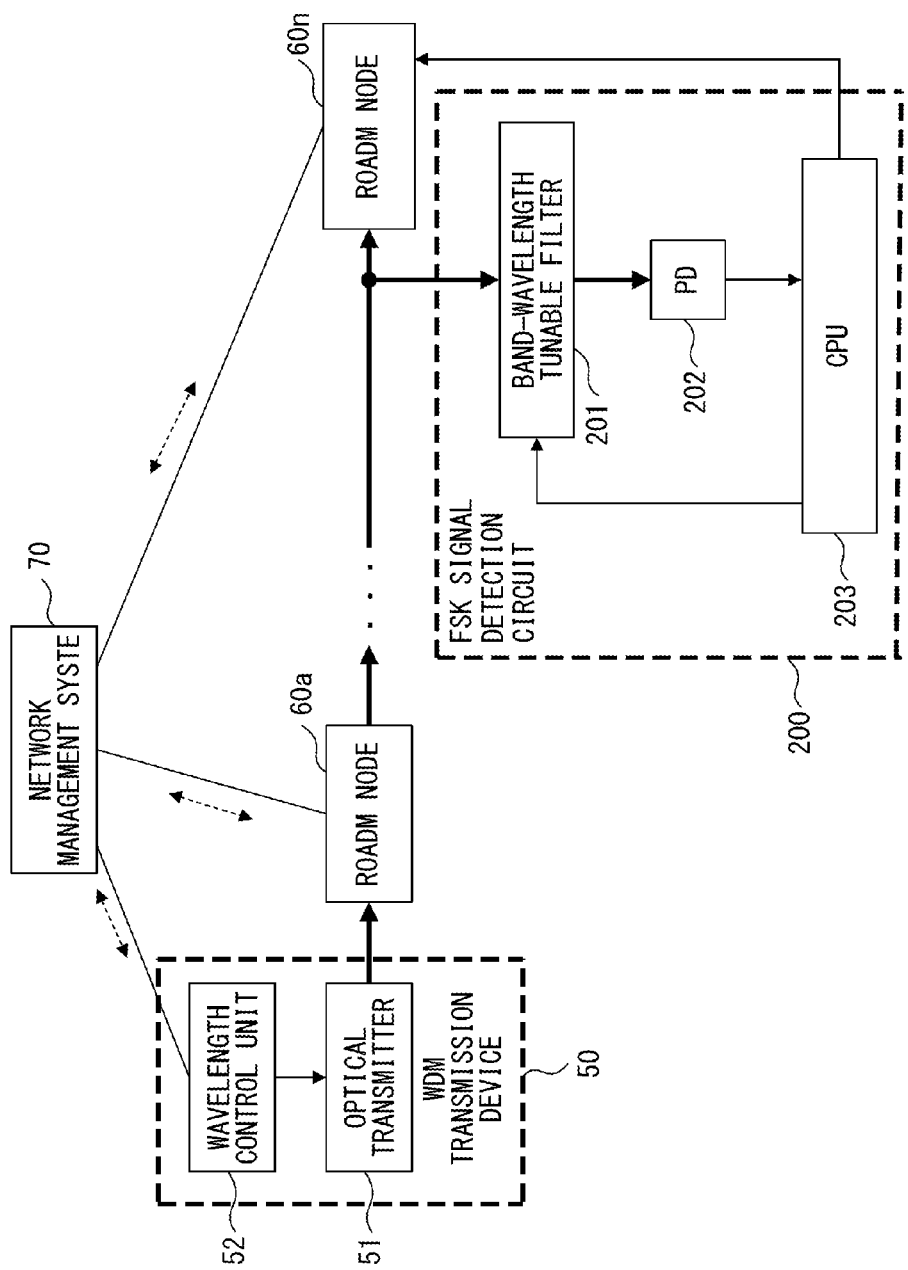
F I G. 17

TRANSMISSION DEVICE AND OPTICAL TRANSMISSION SYSTEM

CROSS-REFERENCE TO RELATED APPLICATION

This application is based upon and claims the benefit of priority of the prior Japanese Patent Application No. 2014-072381, filed on Mar. 31, 2014, the entire contents of which are incorporated herein by reference.

FIELD

The embodiments discussed herein are related to a transmission device which has a function of detecting a signal superimposed on an optical signal.

BACKGROUND

A photonic network provided with a reconfigurable optical add/drop multiplexer and/or a wavelength cross connect has been proposed and developed. A reconfigurable optical add/drop multiplexer branches an optical signal of a requested wavelength from a WDM signal to guide the signal to a client, and adds a client signal of the requested wavelength into the WDM signal. A wavelength cross connect (WXC, or a photonic cross connect (PXC)) may control the route of an optical signal for each wavelength without converting an optical signal into an electric signal.

In the above-mentioned photonic network, a plurality of optical paths (wavelength paths in this case) that use the same wavelength may be established. Therefore, to configure or operate a network without fail, for example, a scheme of superimposing a path ID which identifies each optical path on an optical signal and transmits the signal has been proposed. In this case, an optical node device (a reconfigurable optical add/drop multiplexer, a wavelength cross connect, etc. in this example) in the photonic network has the function of detecting a path ID superimposed on the optical signal. In this case, since each optical path may be identified without fail in the optical node device, a fault that an optical fiber is connected to a wrong port etc. may be monitored, detected, and avoided.

An optical transmission device in an optical fiber transmission system has been proposed as one of the related technologies (for example, Japanese Laid-open Patent Publication No. 2004-70130 (U.S. Pat. No. 3,763,803)).

A signal indicating a path ID (hereafter referred to as a path ID signal) is superimposed on an optical signal in, for example, an intensity modulation format. However, in this case, a cross gain modulation occurs in an optical amplifier (for example, an EDFA) which collectively amplifies a WDM signal and/or stimulated Raman scattering in an optical fiber. The cross gain modulation may cause a crosstalk of a path ID signal between wavelength channels in the WDM signal. As a result, in an optical node device, there is the possibility that a path ID is erroneously identified.

Under the situation above, a method of superimposing a path ID signal on an optical signal in the frequency modulation format has been studied. However, when an optical signal passes through a plurality or a large number of optical nodes, the detection sensitivity of a path ID signal may drops. When the detection sensitivity of the path ID signal drops, an optical transmission device may be unable to correctly recognize the path ID of a received optical signal, thereby causing a trouble in establishing a network. The problem is not limited to the case where a path ID signal is superimposed on an optical signal, but may occur when a signal is superimposed on an optical signal in the frequency modulation format.

SUMMARY

According to an aspect of the embodiments, a transmission device that receives an optical signal on which a frequency modulated signal is superimposed includes: an optical filter configured to filter the optical signal; a filter controller configured to control a passband of the optical filter based on a change of power of the optical signal; and a signal detection unit configured to detect the frequency modulated signal based on the change of the power of the optical signal filtered by the optical filter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of a transmission circuit of a WDM transmission device;

FIG. 3 illustrates an example of a path ID signal;

FIG. 5 is an explanatory view of frequency modulation;

FIG. 7 is an explanatory view of passband narrowing caused by a multistage transmission;

FIG. 11 is a flowchart of an operation of an FSK signal detection circuit according to the first embodiment;

FIG. 15 illustrates a configuration of an optical transmission system according to the third embodiment;

FIG. 17 illustrates a configuration of an optical transmission system according to the fourth embodiment.

DESCRIPTION OF EMBODIMENTS

Figure 1:
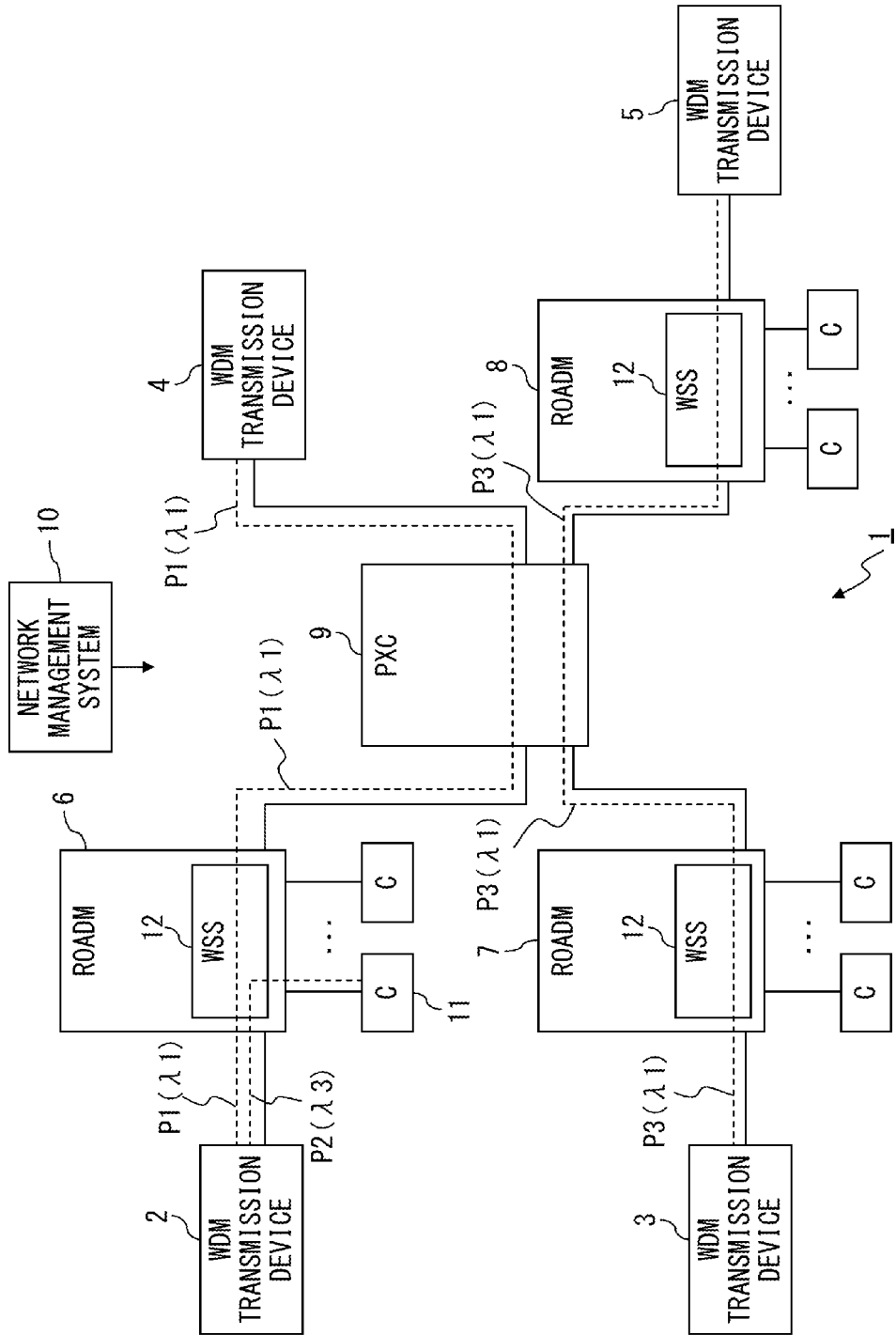
FIG. 1 illustrates an example of an optical transmission system.

FIG. 1 illustrates an example of an optical transmission system according to an embodiment of the present invention. An optical transmission system 1 illustrated in FIG. 1 includes WDM transmission devices 2 through 5, reconfigurable optical add/drop multiplexers (ROADM) 6 through 8, a photonic cross connect (PXC, or wavelength cross connect (WXC)) 9, and a network management system (NMS) 10.

The WDM transmission devices 2, 3, and 5 are respectively connected to the ROADMs 6, 7, and 8 through an optical fiber line. Each of the ROADMs 6-8 is connected to the photonic cross connect 9 through the optical fiber line. The WDM transmission device 4 is connected to the photonic cross connect 9 through the optical fiber line. Each optical fiber line may be provided with one or more optical amplifiers.

The WDM transmission devices 2-5 may transmit a WDM signal and receive a WDM signal. A plurality of wavelength channels are multiplexed in the WDM signal. That is, the WDM signal includes a plurality of optical signals having different wavelengths. Each of the ROADMs 6-8 includes a wavelength selective switch (WSS) 12, and may process an optical signal for each wavelength channel. That is, each of the ROADMs 6-8 may pass a specified wavelength channel in the input WDM signals. Each of the ROADMs 6-8 may branch an optical signal of a specified wavelength from the input WDM signal and guide the branched signal to a client. Furthermore, each of the ROADMs 6-8 may add an optical signal received from a client into the WDM signal. The photonic cross connect 9 is provided with a plurality of input ports and a plurality of output ports, and guides an input signal to an output port to realize a specified optical path. Furthermore, as with the ROADMs 6-8, the photonic cross connect 9 may have the function of branching an optical signal from a WDM signal, and adding an optical signal into the WDM signal.

The network management system 10 manages the state of the optical transmission system 1, and controls the WDM transmission devices 2-5, the ROADMs 6-8, and the photonic cross connect 9. For example, the network management system 10 controls the WDM transmission devices 2-5, the ROADMs 6-8, and the photonic cross connect 9 to establish an optical path specified by a user.

In the example illustrated in FIG. 1, optical paths P1 through P3 are established in the optical transmission system 1. Each optical path is expressed as a broken line. The optical path P1 transmits an optical signal from the WDM transmission device 2 to the WDM transmission device 4 through the ROADM 6 and the photonic cross connect 9. The optical path P2 transmits an optical signal from the WDM transmission device 2 to a client 11 through the ROADM 6. The optical path P3 transmits an optical signal from the WDM transmission device 3 to the WDM transmission device 5 through the ROADM 7, the photonic cross connect 9, and the ROADM 8. Each of the optical paths P1 through P3 may transmit an optical signal bidirectionally.

In the optical transmission system 1 with the above-mentioned configuration, the network management system 10 may assign the same wavelength to different optical paths to efficiently or flexibly use communication resources. In the example illustrated in FIG. 1, the wavelengths λ1, λ3, and λ1 are respectively assigned to the optical paths P1, P2, and P3.

A user or a network administrator may request to confirm that an optical path has been correctly established. However, when the same wavelength is assigned to a plurality of optical paths, it is difficult to identify each optical path only by monitoring the spectrum of each wavelength channel. For example, it is difficult to identify the optical paths P1 and P3 only by monitoring the spectrum of each wavelength channel in the photonic cross connect 9.

Thus, the network management system 10 assigns a path ID to each optical path. The source device of an optical path superimposes a path ID signal indicating a path ID on the optical signal to be transmitted through the optical path. For example, the WDM transmission device 2 superimposes the path ID signal indicating "path ID=1" on the optical signal to be transmitted through the optical path P1, and superimposes the path ID signal indicating "path ID=2" on the optical signal to be transmitted through the optical path P2.

The optical transmission device is provided with a signal detection circuit for obtaining a path ID by detecting the path ID signal superimposed on an optical signal. In the example illustrated in FIG. 1, the optical transmission device corresponds to the WDM transmission devices 2-5, the ROADMs 6-8, and the photonic cross connect 9. However, the signal detection circuit is not to be provided for all optical transmission devices. A plurality of signal detection circuits may be provided for one optical transmission device. Furthermore, the signal detection circuit may be included in an optical transmission device, or connected to the optical transmission device.

FIG. 2 illustrates an example of a transmission circuit of a WDM transmission device. A WDM transmission circuit 20 includes optical transmitters 21-1 through 21-$n$ and a multiplexer 22 as illustrated in FIG. 2. The WDM transmission circuit 20 is provided in, for example, the WDM transmission devices 2-5.

The optical transmitters 21-1 through 21-$n$ respectively generate an optical signal by modulating carrier light using an input data sequence. The wavelengths λ1 through λn (that is, optical frequency) of the carrier light used by the optical transmitters 21-1 through 21-$n$ are different from one another. The optical transmitters 21-1 through 21-$n$ are assigned by the network management system 10 the path ID for identification of an optical path. The path ID is assigned as a path ID signal to the corresponding optical transmitters 21-1 through 21-$n$. The path ID signal is, for example, a code of a specified length. In this case, the code for identification of each optical path is orthogonal to each other. The path ID signal may be a tone signal of a different frequency. The tone signal is not specifically limited, but is, for example, a sine wave signal. The rate (bit rate of a code, a frequency of a tone signal, etc.) of a path ID signal is sufficiently low as compared with the rate of a data sequence.

In the present embodiment, the path ID signal is transmitted using a frame of a specified length. The frame includes a header and a payload as illustrated in FIG. 3. A header is formed in a data pattern specified in advance. Assume that the data pattern of a header is the same in all path ID signals. A header is used as synchronous information for detection of the start of the path ID signal in the optical transmission device on the receiver side. A payload stores the information for identifying an optical path (that is, a path ID). However, the payload may store other information (for example, the information which identifies a starting node of an optical path, the information about the route of an optical path, etc.). It is assumed that a path ID signal is repeatedly transmitted periodically.

The optical transmitters 21-1 through 21-$n$ respectively superimpose a path ID signal on an optical signal in the frequency modulation format. That is, the optical transmitters 21-1 through 21-$n$ respectively outputs an optical signal on which a path ID signal is superimposed in the frequency modulation format. Then, the multiplexer 22 multiplexes the optical signals output from the optical transmitters 21-1 through 21-$n$ and generates a WDM signal.

The modulating formats for a primary signal data sequence used by the optical transmitters 21-1 through 21-n are not to be the same with one another. For example, the optical transmitter 21-1 may transmit a QPSK modulated optical signal, and the optical transmitter 21-2 may transmit a 16 QAM modulated optical signal. Furthermore, the symbol rates or the bit rates of the optical signals output from the optical transmitters 21-1 through 21-n are not to be the same as one another.

Figure 4:
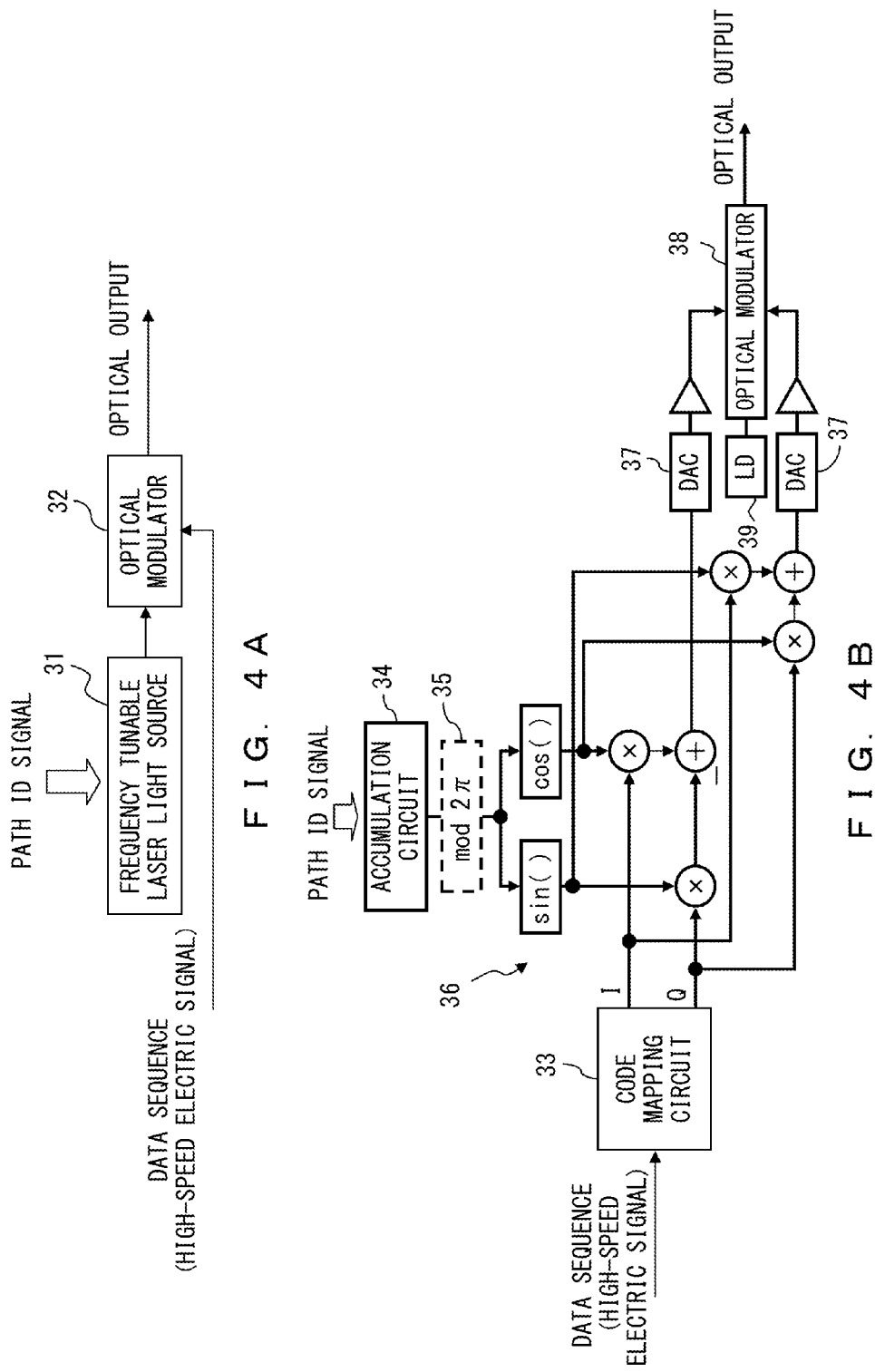
FIGS. 4A and 4B illustrate embodiments of an optical transmitter.

FIGS. 4A and 4B illustrate configurations of an optical transmitter having the function of superimposing a path ID signal. The optical transmitters illustrated in FIGS. 4A and 4B are embodiments of the optical transmitters 21-1 through 21-n illustrated in FIG. 2. However, the configuration of superimposing a path ID signal on an optical signal in the frequency modulation format is not limited to the configuration or the method illustrated in FIGS. 4A and 4b.

The optical transmitter illustrated in FIG. 4A includes a frequency tunable laser light source 31 and an optical modulator 32. The frequency tunable laser light source 31 generates continuous wave light with an oscillation frequency corresponding to a frequency control signal. Therefore, by assigning a path ID signal as the frequency control signal, the frequency tunable laser light source 31 may generate the continuous wave light with the oscillation frequency corresponding to the path ID signal. The optical modulator 32 modulates the continuous wave light generated by the frequency tunable laser light source 31 using a data sequence. As a result, an optical signal on which a path ID signal is superimposed in the frequency modulation format is generated.

The optical transmitter illustrated in FIG. 4B realizes frequency modulation superimposing in a digital signal processing. That is, a code mapping circuit 33 maps a data sequence on an I component data sequence and a Q component data sequence. An accumulation circuit 34 integrates a path ID signal. In the configuration illustrated in FIG. 4B, a path ID signal f(t) is a digital data sequence indicating the amplitude time waveform of a path ID code. The accumulation circuit 34 outputs the following phase information θ(t) as an integration result.

$$\theta(t)=\int 2\pi f(t)dt$$

A mod $2\pi$ circuit 35 converts the output value of the accumulation circuit 34 into a value in the range of 0 through $2\pi$. If the value of the accumulation circuit 34 is designed as 0 through $2\pi$, the mod $2\pi$ circuit 35 may be omitted.

A rotational operation circuit 36 rotates the I component data sequence and the Q component data sequence using phase information θ(t) by the following operation. I and Q are input data of the rotational operation circuit 36. I' and Q' are output data of the rotational operation circuit 36

$$I'=I \cos \theta(t) - Q \sin \theta(t)$$

$$Q'=I \sin \theta(t) + Q \cos \theta(t)$$

The data I' and the data Q' obtained by the rotational operation circuit 36 are respectively converted by a D/A converter 37 into an analog signals, and transmitted to an optical modulator 38. The optical modulator 38 generates a modulated optical signal by modulating the continuous wave light output from a laser light source 39 using the data I' and the data Q'. As a result, an optical signal on which a path ID signal is superimposed by the frequency modulation format is generated.

FIG. 5 is an explanatory view of frequency modulation. FIG. 5 illustrates the time-resolved output spectrum of an optical transmitter at time T0, T1 through T4. The optical spectrum at each time point spreads based on the high-speed modulation by a primary signal data sequence. That is, the width and the shape of an optical spectrum depends on the modulation format and the modulation speed of an optical primary signal.

On an optical signal output from an optical transmitter, a path ID signal is superimposed in the frequency modulation format as explained with reference to FIGS. 2 through 4B. In the example illustrated in FIG. 5, a path ID signal is a digital code, and a path ID code superimposed on an optical signal at time T1 through T4 is "0110". The center frequency of the carrier light used by the optical transmitter is f1.

At time T0, a path ID code is not superimposed on the optical signal. In this case, the optical transmitter does not shift the frequency of the optical signal. Therefore, the center of the spectrum of the optical signal at time T0 is f1.

At time T1, "0" is superimposed on the optical signal. In this case, the optical transmitter shits the frequency of the optical signal by −Δf in the present embodiment. Therefore, the center of the spectrum of the optical signal at time T1 is f1−Δf.

At time T2, "1" is superimposed on the optical signal. In this case, the optical transmitter shifts the frequency of the optical signal by +Δf in the present embodiment. Therefore, the center of the spectrum of the optical signal at time T2 is f1+Δf. Similarly, the center of the spectrum of the optical signal at time T3 is f1+Δf, and the center of the spectrum of the optical signal at time T4 is f1−Δf.

Δf is sufficiently lower than the frequency of the carrier light. Furthermore, Δf is determined so that it does not interfere with the adjacent channel of the WDM transmission system. For example, in the WDM transmission system in which a wavelength channel is arranged on the ITU-T regulated 50 GHz/100 GHz frequency grid, Δf is not specifically restricted, but may be defined as 1 MHz through 1 GHz. If Δf is small, the fluctuation of the frequency (light source line width) of the carrier light itself is not ignored as noise, and the detection sensitivity of a superimposition signal drops. Therefore, it is preferable that Δf is determined by considering the interference with an adjacent channel and the detection sensitivity.

In the example illustrated in FIG. 5, the frequency shifts are respectively "−Δf" and "+Δf" when the superimposition signal is "0" and "1", but the present invention is not limited to these settings. For example, the frequency shifts may be respectively "+Δf" and "−Δf" when the superimposition signal is "0" and "1". It may be possible to set the frequency shift as 0 when the superimposition signal is "0 (or 1)", and the optical frequency may be shifted when the superimposition signal is "1 (or 0)". Furthermore, in the 4-level frequency phase shift keying, for example, frequency shifts "−Δf", "−0.5 Δf", "+0.5 Δf", and "+Δf" may be assigned respectively to 2-bit superimposition signals "00", "01", "10", and "11". Furthermore, a superimposition signal may be modulated using the multi-level frequency shift keying other than 2-level or 4-level.

In the embodiments illustrated in FIGS. 4A and 4B, a path ID signal is a digital signal. However, the method of shifting an optical frequency is substantially the same when a path ID signal is an analog signal. Note that if a path ID signal is an analog signal, the amount of frequency shift changes not discretely but continuously.

Figure 6A:
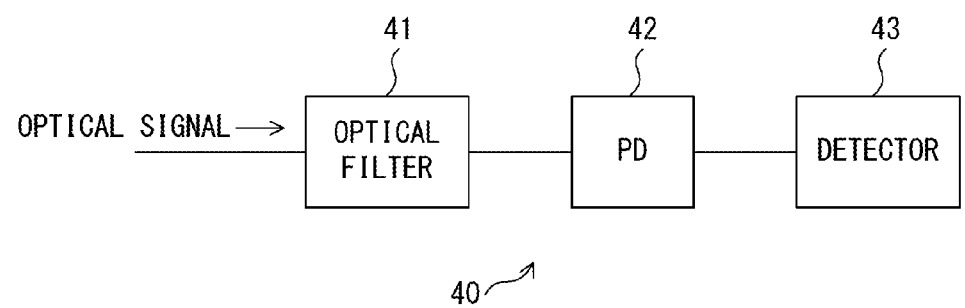
FIGS. 6A and 6B are explanatory views of detecting a frequency modulated signal.
Figure 6B:
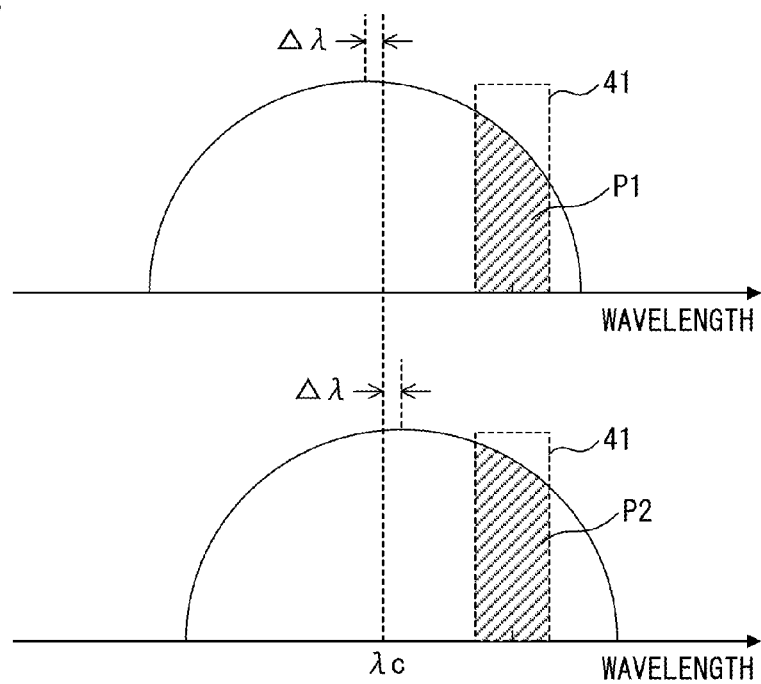

FIGS. 6A and 6B are explanatory views of detecting a frequency modulated signal. In the following descriptions, the frequency modulated signal superimposed on an optical signal may be referred to as an FSK (frequency shift keying) signal.

An FSK signal detection circuit 40 which detects an FSK signal from an optical signal includes an optical filter 41, a photo detector 42, and a detector 43 as illustrated in, for example, FIG. 6A. The input optical signal is guided to the optical filter 41.

An FSK signal is superimposed on the input optical signal. Therefore, the center wavelength of the optical signal fluctuates between $\lambda c-\Delta\lambda$ and $\lambda c+\Delta\lambda$ according to the FSK signal as illustrated in FIG. 6B. FIG. 6B illustrates the spectrum of the optical signal and the passband of the optical filter 41. The $\lambda c$ illustrated in FIG. 6B corresponds to the frequency f1 illustrated in FIG. 5.

The width of the optical filter 41 is narrower than the width of the spectrum of the optical signal. The passband of the optical filter 41 is arranged at the position shifted from the center wavelength $\lambda c$ of the optical signal to the long wavelength side or the short wavelength side by a specified offset. In the example illustrated in FIG. 6B, the passband of the optical filter 41 is arranged on the long wavelength side with respect to the center wavelength $\lambda c$ of the optical signal. Therefore, the optical filter 41 extracts the component of apart of the spectrum of the optical signal.

The photo detector 42 converts the output light of the optical filter 41 (that is, the optical signal filtered by the optical filter 41) into an electric signal. The electric signal indicates the power of the output light of the optical filter 41. The power of the output light of the optical filter 41 is expressed as the area of the shaded part illustrated in FIG. 6B. That is, the power of the output light of the optical filter 41 is expressed as P1 when the center wavelength of the optical signal is $\lambda c-\Delta\lambda$, and expressed as P2 when the center wavelength of the optical signal is $\lambda c+\Delta\lambda$. Thus, the FSK signal superimposed on the optical signal is converted into the change of optical power by the optical filter 41 and the photo detector 42. That is, the FSK signal is converted substantially into an intensity modulated signal.

The operation speed of the photo detector 42 is sufficiently lower than the symbol rate of a data signal. In this case, the data signal component is averaged by the photo detector 42, and the intensity modulated signal corresponding to the FSK signal is guided to the detector 43. Note that a low pass filter for removing a data signal component may be provided on the input side or the output side of the photo detector 42. Furthermore, a capacitor for removing a DC component may be provided between the photo detector 42 and the detector 43.

The detector 43 detects an FSK signal according to the intensity modulated signal generated by the optical filter 41 and the photo detector 42. Practically, the detector 43 compares the power of the output light of the optical filter 41 with a specified threshold, and decides each bit of the FSK signal depending on the comparison result. For example, when the power of the output light of the optical filter 41 is larger than the threshold, it is decided that the FSK signal is "1". If the power of the output light of the optical filter 41 is not more than the threshold, it is decided that the FSK signal is "0".

Thus, the FSK signal detection circuit 40 can detect the FSK signal superimposed on the optical signal using the optical filter 41. Therefore, when the path ID signal is superimposed on the optical signal in the frequency modulation format in the optical transmission device on the transmission side, the FSK signal detection circuit 40 can detect the path ID signal.

When an optical signal passes through a plurality or a large number of optical nodes, the detection sensitivity of an FSK signal (that is, a path ID signal) may drop. If the detection sensitivity of the path ID signal drops, there is the possibility that the optical transmission device is unable to correctly recognize the path ID of a received optical signal. In this case, a user or a network administrator may be unable to confirm whether or not a specified optical path has been correctly established. Described below is the cause of the problem.

Each node of the optical transmission system which transmits a WDM signal is provided with a reconfigurable optical add/drop multiplexer (ROADM) as illustrated in FIG. 1. Each ROADM includes a wavelength selective switch (WSS) in this embodiment. The WSS may process each wavelength channel of the WDM signal. That is, the WSS has the function of filtering respective optical signals in the WDM signal.

Therefore, when an optical signal is transmitted through a ROADM, the optical signal is filtered by the WSS of each ROADM. For example, in the example illustrated in FIG. 1, the optical signal transmitted from the WDM transmission device 2 to the WDM transmission device 4 through the optical path P1 passes through one WSS 12. Also, the optical signal transmitted from the WDM transmission device 3 to the WDM transmission device 5 through the optical path P3 passes through two WSSs 12. When there are a large number of WSSs through which an optical signal passes, passband narrowing may occur.

FIG. 7 is an explanatory view of passband narrowing caused by a multistage transmission. The horizontal axis indicates the relative optical frequency when the center frequency of the optical primary signal is set as 0. The solid line illustrated in FIG. 7 indicates the spectrum of the optical primary signal which transmits 28 Gbaud QPSK modulated signal. The vertical axis indicates the transmittance of the WSS for the optical signal.

The transmittance of the WSS for each wavelength channel is designed so that it sufficiently passes the optical signal of the corresponding wavelength channel, and sufficiently removes the adjacent channel. Therefore, when the optical signal passes one WSS, the main component of the spectrum of the optical signal is transmitted without being removed by the WSS.

However, when the optical signal passes through a plurality of WSSs, the passband of each WSS overlaps that of another WSS, thereby narrowing the passband for the optical signal. For example, FIG. 7 illustrates narrowing the width of the passband by a WSS for an optical signal when the optical signal passes through 15 WSSs. In the example illustrated in FIG. 7, when the number of WSSs through which the optical signal passes increases from 1 to 15, the passband of the WSSs is about 20 GHz narrowed. When the passband narrowing by a plurality of WSSs occurs, a part of the main component of the spectrum of the optical signal is cut off. In the following descriptions, the passband by a plurality of WSSs when an optical signal passes through the plurality of WSSs may be referred to as a "multistage WSS passband".

The center wavelength of a multistage WSS passband does not always match the center wavelength of the corresponding optical signal. For example, in the example illustrated in FIG. 7, the center frequency of the multistage WSS passband (that is, the center wavelength) is shifted to the low frequency side (that is, the long wavelength side) with respect to the center frequency of the corresponding optical signal.

If the filtering is performed using an optical filter in which the center wavelength of a passband is shifted from the center wavelength of the optical signal when the frequency modulated signal is superimposed on the optical signal, the frequency modulated signal is converted into an intensity modulated signal as described above with reference to FIGS. 6A and 6B. Therefore, when the center wavelength of a multistage WSS passband is shifted with respect to the center wavelength of the corresponding optical signal, the multistage WSS passband provides a similar function of the optical filter 41 illustrated in FIG. 6A. That is, when a frequency modulated signal is superimposed on an optical signal, a multistage WSS passband may convert the frequency modulated signal into an intensity modulated signal.

Figure 8:
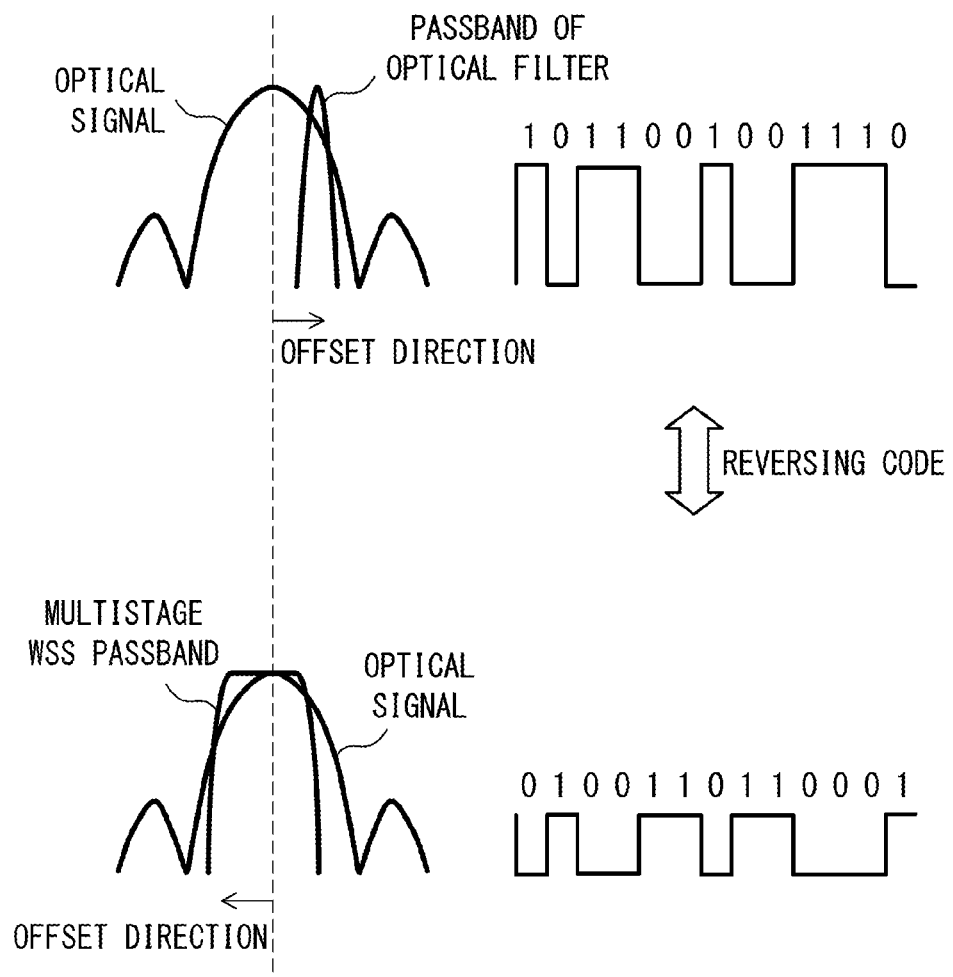
FIG. 8 is an explanatory view of the relationship between an optical filter and a multistage WSS passband in an FSK signal detection circuit.

FIG. 8 is an explanatory view of the relationship between the optical filter 41 of the FSK signal detection circuit 40 and a multistage WSS passband. In the following descriptions, the state in which a shift with respect to the center wavelength of an optical signal may be referred to as an "offset". The direction (long wavelength side or short wavelength side) of the shift with respect to the center wavelength of an optical signal may be referred to as an "offset direction".

In the example illustrated in FIG. 8, the passband of the optical filter 41 of the FSK signal detection circuit 40 is arranged on the long wavelength side with respect to the center wavelength of the optical signal. That is, the offset direction of the optical filter 41 is the "long wavelength side". Then, an intensity modulated signal is generated based on the change of the power of the output light of the optical filter 41, and the code "101100 . . . " is detected from the intensity modulated signal.

On the other hand, the multistage WSS passband is formed on the short wavelength side with respect to the center wavelength of the optical signal. That is, the offset direction of the multistage WSS passband is the "short wavelength side" which is opposite the offset direction of the optical filter 41. In this case, the direction of the change of the power of the output light of the multistage WSS passband is opposite the direction of the change of the power of the output light of the optical filter 41. For example, assume that the power of the output light of the optical filter 41 increases when the center wavelength of the optical signal is shifted to the long wavelength side, and the power of the output light of the optical filter 41 decreases when the center wavelength of the optical signal is shifted to the short wavelength side. In this case, when the center wavelength of the optical signal is shifted to the long wavelength side, the power of the output light of the multistage WSS passband decreases, and when the center wavelength of the optical signal is shifted to the short wavelength side, the power of the output light of the multistage WSS passband increases. That is, the logic of each bit of the intensity modulated signal indicating the change of the power of the output light of the multistage WSS passband is inverted to the logic of the corresponding bit of the intensity modulated signal indicating the change of the power of the output light of the optical filter 41. Therefore, the change of the optical power generated by the optical filter 41 is attenuated by the change of the optical power generated by the multistage WSS passband.

Figure 9:
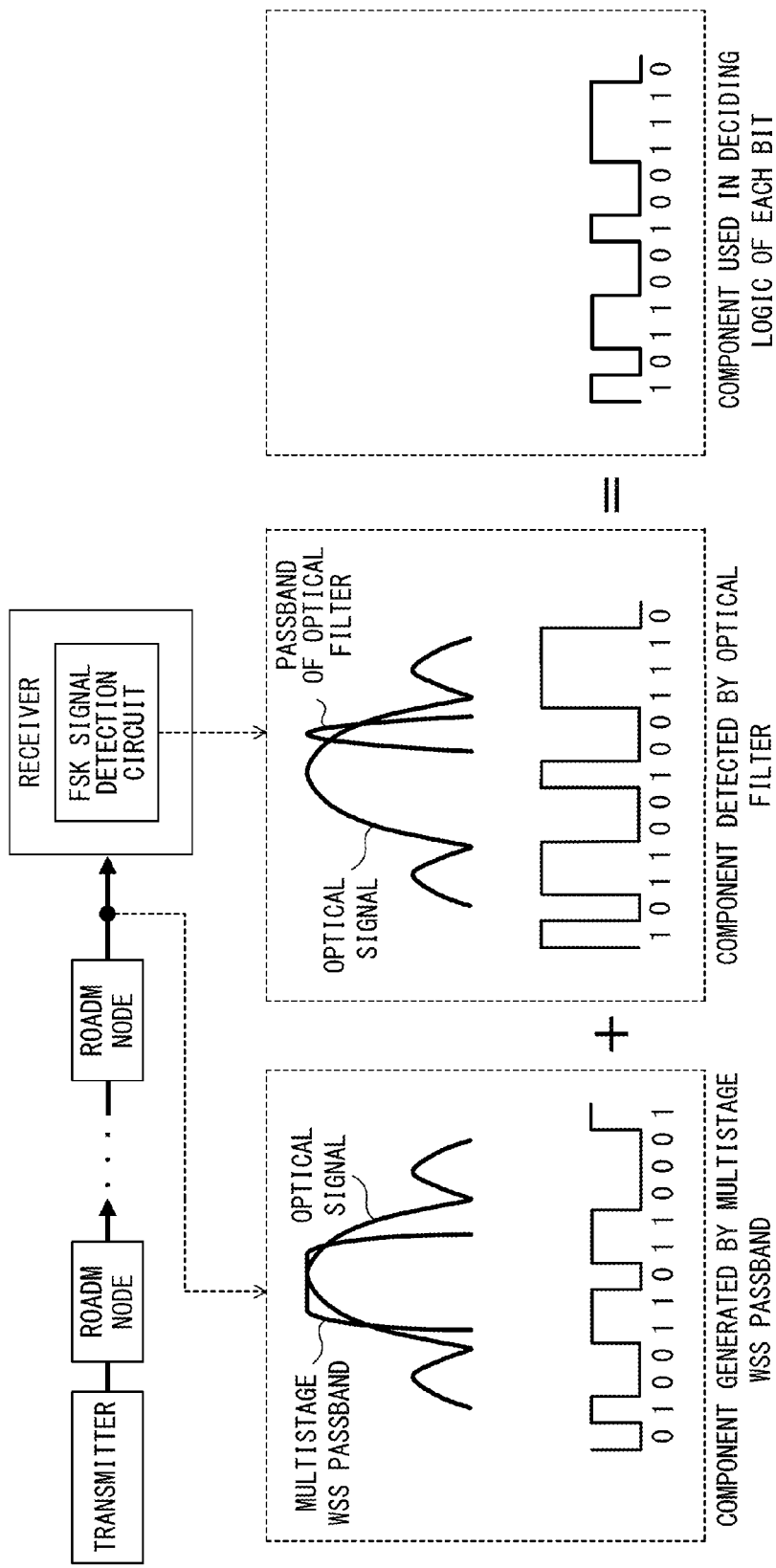
FIG. 9 is a schematic diagram of the drop of the detection sensitivity of an FSK signal.

FIG. 9 is a schematic diagram of the drop of the detection sensitivity of an FSK signal. In FIG. 9, as in the example illustrated in FIG. 8, the offset direction of a multistage WSS passband is opposite the offset direction of the optical filter 41.

In this case, the amplitude of the intensity modulated signal indicating the change of the power of the output light of the optical filter 41 is suppressed or attenuated by the change of the power of the output light of the multistage WSS passband. The detection sensitivity of an FSK signal is substantially dependent on the amplitude of the intensity modulated signal converted from the FSK signal. Therefore, when the offset direction of the multistage WSS passband is opposite the offset direction of the optical filter 41, the detection sensitivity of the FSK signal superimposed on the optical signal drops in the FSK signal detection circuit.

Accordingly, the optical transmission device according to the embodiments of the present invention has the function of solving the problem. That is, the optical transmission device according to the embodiments of the present invention has the function of avoiding the drop of the detection sensitivity of the FSK signal caused by passband narrowing. Described below are some embodiments of the present invention.

First Embodiment

Figure 10:
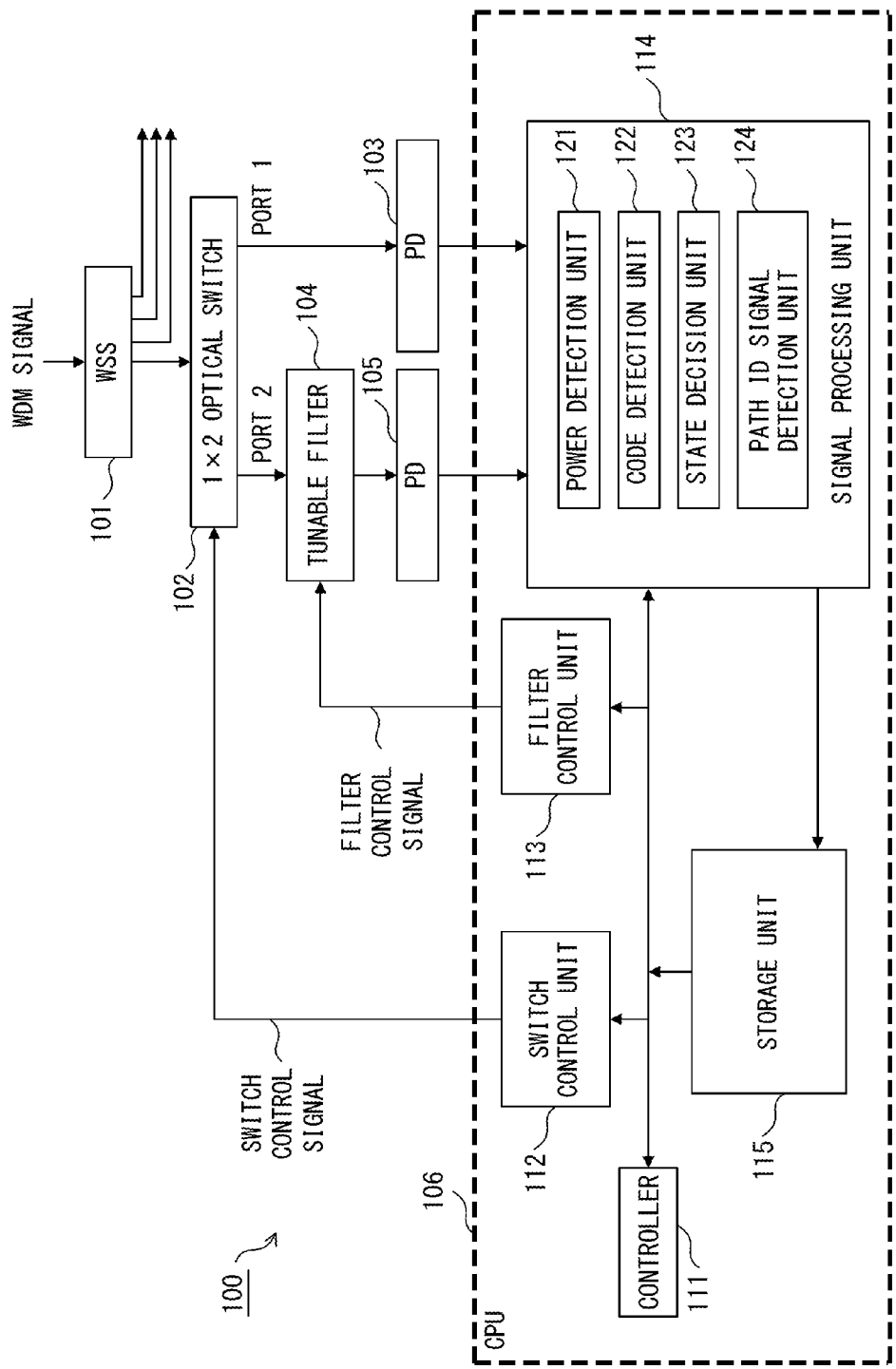
FIG. 10 illustrates a configuration of an FSK signal detection circuit according to the first embodiment.

FIG. 10 illustrates a configuration of an FSK signal detection circuit according to the first embodiment of the present invention. An FSK signal detection circuit 100 according to the first embodiment is provided in the optical transmission device which transmits a WDM signal. For example, the FSK signal detection circuit 100 is provided in the WDM transmission devices 2 through 5 illustrated in FIG. 1. The FSK signal detection circuit 100 may also be provided in the reconfigurable optical add/drop multiplexers 6 through 8 and the photonic cross connect 9 illustrated in FIG. 1.

The FSK signal detection circuit 100 includes, as illustrated in FIG. 10, a wavelength selective switch (WSS) 101, a 1×2 optical switch 102, a photo detector (PD) 103, a wavelength tunable filter 104, a photo detector (PD) 105, and a CPU 106. A WDM signal is input to the FSK signal detection circuit 100.

A plurality of optical signals with different wavelengths are multiplexed in the WDM signal. A frequency modulated signal is superimposed on each of the optical signals. In the present embodiment, the frequency modulated signal is the path ID signal. That is, the path ID signal is superimposed on each optical signal in the frequency modulation format. The path ID signal includes a header and a payload as illustrated in FIG. 3. The header is formed by a specified data pattern. The payload stores the information for identification of an optical path (for example, a path ID). It is assumed that the path ID signal is, for example, periodically and repeatedly transmitted.

The wavelength selective switch 101 selects an optical signal of a specified wavelength from the input WDM signal. In this case, the wavelength selective switch 101 selects an optical signal of one wavelength channel. The optical signal selected by the wavelength selective switch 101 is guided to the 1×2 optical switch 102. In the following descriptions, the optical signal selected by the wavelength selective switch 101 may be referred to as a "selected optical signal".

The 1×2 optical switch 102 is provided with two output ports. The 1×2 optical switch 102 outputs a selected optical signal through port 1 or port 2 according to a switch control signal provided by the CPU 106.

The photo detector 103 converts the optical signal output through port 1 of the 1×2 optical switch 102 into an electric signal. The wavelength tunable filter 104 filters the optical signal output through port 2 of the 1×2 optical switch 102. The passband of the wavelength tunable filter 104 is controlled by the filter control signal provided from the CPU 106. The photo detector 105 converts the optical signal filtered by the wavelength tunable filter 104 into an electric signal.

The photo detector 103 and the photo detector 105 are respectively realized by a photodiode. In this case, the operation speed of the photodiode is sufficiently low for the symbol rate of the data signal transmitted by the optical signal. Therefore, the data signal is averaged by the photo detectors 103 and 105. A capacitor for removing the DC component may be provided at the output side of the photo detectors 103 and 105. In this case, the averaged data signal component is removed by the capacitor. Furthermore, the operation speed of the photodiode is sufficiently high for the bit rate (or symbol rate) of the path ID signal superimposed on the optical signal.

The CPU 106 includes a controller 111, a switch control unit 112, a filter control unit 113, a signal processing unit 114, and a storage unit 115. The CPU 106 detects a path ID signal superimposed on the selected optical signal. The CPU 106 includes, for example, a processor element and memory. However, apart of the process of the CPU 106 may be realized by a hardware circuit.

The controller 111 controls the switch control unit 112, the filter control unit 113, and the signal processing unit 114 in the process of detecting a path ID signal. The switch control unit 112 generates a switch control signal according to an instruction from the controller 111. The switch control signal specifies the port 1 or port 2 of the 1×2 optical switch 102. The filter control unit 113 generates a filter control signal according to an instruction from the controller 111 or the signal processing unit 114. The filter control signal specifies the center wavelength of the passband of the wavelength tunable filter 104.

The signal processing unit 114 includes a power detection unit 121, a code detection unit 122, a state decision unit 123, and a path ID signal detection unit 124. The signal processing unit 114 detects the state of the selected optical signal or the state of the optical transmission path through which the selected optical signal is transmitted. The signal processing unit 114 detects a path ID signal based on the change of the power of the selected optical signal filtered by the wavelength tunable filter 104.

The power detection unit 121 detects the power of the selected optical signal based on the output signal of the photo detector 103. In addition, the power detection unit 121 detects the power of the selected optical signal filtered by the wavelength tunable filter 104 based on the output signal of the photo detector 105.

The code detection unit 122 generates a bit sequence indicating the change of the power of the selected optical signal using the detection result of the power detection unit 121. In this case, for example, the code detection unit 122 generates "1" when, for example, the power of the selected optical signal is higher than a threshold, and generates "0" when the power of the selected optical signal is lower than or equal to the threshold. That is, the code detection unit 122 generates an intensity modulated signal indicating the change of the power of the selected optical signal.

The state decision unit 123 detects a header of a path ID signal in the bit sequence generated by the code detection unit 122. In this case, it is assumed that the state decision unit 123 also detects the bit sequence in which the logic of each bit of the header is inverted (that is, the inverted header). It is also assumed that the data pattern of the header of the path ID signal is specified in advance, and the state decision unit 123 recognizes the data pattern. Then, the state decision unit 123 outputs code information about which has been detected, a header or a inverted header.

The path ID signal detection unit 124 generates a bit sequence indicating the change of the power of the selected optical signal filtered by the wavelength tunable filter 104 using the detection result of the power detection unit 121. In this case, as with the code detection unit 122, the path ID signal detection unit 124 generates "1" when the detected optical power is higher than a threshold, and "0" when the detected optical power is lower than or equal to the threshold. That is, the path ID signal detection unit 124 generates an intensity modulated signal indicating the change of the power of the selected optical signal filtered by the wavelength tunable filter 104. However, the threshold used by the path ID signal detection unit 124 may be different from the threshold used by the code detection unit 122. The path ID signal detection unit 124 detects the header from the generated bit sequence, and acquires a path ID from the payload area succeeding the header.

The storage unit 115 stores necessary information in the process of detecting a path ID signal. For example, the storage unit 115 stores the initial value of the center wavelength of the passband of the wavelength tunable filter 104. A path ID acquired by the path ID signal detection unit 124 may be written to the storage unit 115. Furthermore, the code information generated by the state decision unit 123 may be written to the storage unit 115.

FIG. 11 is a flowchart of an operation of the FSK signal detection circuit 100 according to the first embodiment. It is assumed that the wavelength selective switch 101 selects a optical signal of a specified wavelength from the input WDM signal. Then the selected optical signal is input to the 1×2 optical switch 102. Also in this embodiment, it is assumed that a path ID signal is detected without inverted when the passband of the wavelength tunable filter 104 is allocated on the long wavelength side of the center wavelength of the selected optical signal. That is, in the present embodiment, an inverted path ID signal is detected when a passband is allocated or formed on the short wavelength side of the center wavelength of the selected optical signal.

In S1, the controller 111 issues an instruction to start detecting an FSK signal to the switch control unit 112 and the signal processing unit 114. According to the instruction, the switch control unit 112 generates a switch control signal to specify port 1. Then, the 1×2 optical switch 102 outputs the selected optical signal through port 1 according to the switch control signal. That is, the selected optical signal is guided to the photo detector 103. Therefore, the power detection unit 121 detects the power of the selected optical signal (selected optical signal not filtered by the wavelength tunable filter 104).

In S2, the power detection unit 121 decides whether or not the amplitude of the change of the power of the selected optical signal is higher than a specified threshold. It is assume that when the amplitude of the change of the power of the selected optical signal is higher than the threshold, the value of each bit of the path ID signal can be detected based on the change of the power of the selected optical signal. That is, it is decided that when the amplitude of the change of the power of the selected optical signal is higher than the specified threshold, passband narrowing occurs in the transmission path of an optical signal, and the center wavelength of the multistage WSS passband has been shifted with respect to the center wavelength of the optical signal. That is, it is decided that there is the possibility that the detection sensitivity of a path ID detection signal is affected by the multistage WSS passband. In this case, the process of the signal processing unit 114 is move to S3. On the other hand, when the amplitude of the change of the power of a selected optical signal is lower than or equal to the threshold, it is decided the detection sensitivity of the path ID detection signal is not affected by the multistage WSS passband. In this case, the process of the signal processing unit 114 is move to S8.

In S3, the code detection unit 122 generates a bit sequence indicating the change of the power of the selected optical signal using the detection result of the power detection unit 121. In S4, the state decision unit 123 detects the header (or an inverted header) of the path ID signal in the bit sequence generated by the code detection unit 122.

In S5, the state decision unit 123 generates code information. When a non-inverted header is detected from the above-mentioned bit sequence, the state decision unit 123 decides that the multistage WSS passband is formed on the long wavelength side of the center wavelength of the selected optical signal. In this case, it is decided that the selected optical signal is filtered by the multistage WSS passband formed on the long wavelength side of the center wavelength of the selected optical signal. On the other hand, the state decision unit 123 decides that the multistage WSS passband is formed on the short wavelength side of the center wavelength of the selected optical signal when an inverted header is detected from the above-mentioned bit sequence. In this case, it is decided the selected optical signal is filtered by the multistage WSS passband formed on the short wavelength side of the center wavelength of the selected optical signal. Then, the state decision unit 123 generates code information indicating the decision result.

As described above, the code information indicates whether or not the header of the path ID signal detected from the bit sequence indicating the change of the power of the selected optical signal is inverted. However, the code information substantially indicates whether the multistage WSS passband is formed on the long wavelength side or the short wavelength side of the center wavelength of the selected optical signal. That is, the code information indicates the state of the optical transmission path through which the selected optical signal is transmitted (including the WSS on the optical transmission path). Alternatively, the code information indicates the state of the selected optical signal (that is, the information indicates what kind of multistage WSS passband filters the selected optical signal). The code information generated by the state decision unit 123 is written to the storage unit 115, and transmitted to the filter control unit 113.

In S6, the controller 111 issues an instruction to start controlling the wavelength tunable filter 104 to the switch control unit 112, the filter control unit 113, and the signal processing unit 114. According to the instruction, the switch control unit 112 generates a switch control signal to specify port 2 of the 1×2 optical switch 102. By so doing, according to the switch control signal, the 1×2 optical switch 102 outputs a selected optical signal through port 2. That is, the selected optical signal is guided to the wavelength tunable filter 104. Therefore, the power detection unit 121 detects the power of the selected optical signal filtered by the wavelength tunable filter 104.

Figure 12:
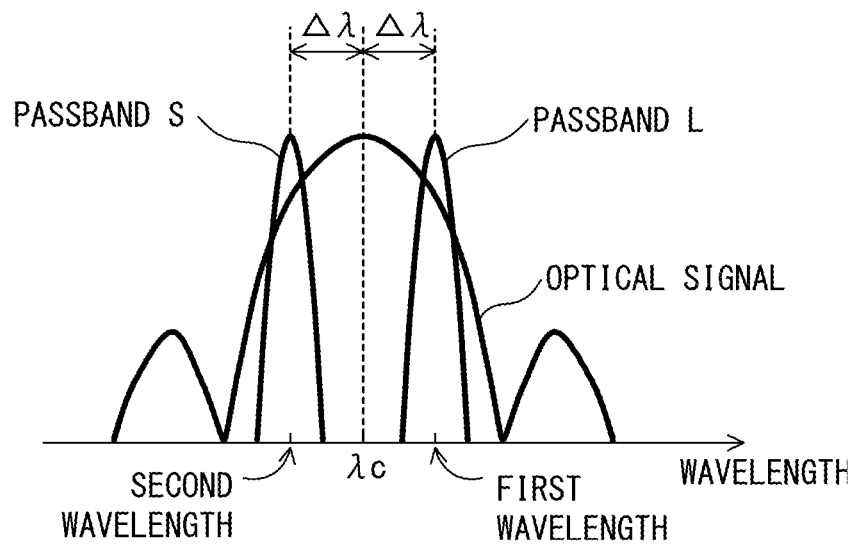
FIG. 12 is an explanatory view of the method of controlling the passband of a wavelength tunable filter.

In S7-S9, the filter control unit 113 controls the passband of the wavelength tunable filter 104 according to the code information generated by the state decision unit 123. Practically, when the multistage WSS passband is formed on the long wavelength side of the center wavelength of the selected optical signal, the filter control unit 113 allocates in S8 the passband of the wavelength tunable filter 104 on the first wavelength. The first wavelength is longer than the center wavelength of the selected optical signal as illustrated in FIG. 12. That is, the passband L is allocated. Thus, when the multistage WSS passband is formed on the long wavelength side of the center wavelength of the selected optical signal, the passband of the wavelength tunable filter 104 is also allocated on the long wavelength side of the center wavelength of the selected optical signal. On the other hand, when the multistage WSS passband is formed on the short wavelength side of the center wavelength of the selected optical signal, the filter control unit 113 allocates in S9 the passband of the tunable filter 104 on the second wavelength. The second wavelength is shorter than the center wavelength of the selected optical signal as illustrated in FIG. 12. That is, the passband S is allocated. Thus, when the multistage WSS passband is formed on the short wavelength side of the center wavelength of the selected optical signal, the passband of the wavelength tunable filter 104 is also allocated on the short wavelength side of the center wavelength of the selected optical signal.

When the center wavelength of the selected optical signal is $\lambda c$, for example, the first wavelength is expressed as $\lambda c + \Delta \lambda$, and the second wavelength is expressed as $\lambda c - \Delta \lambda$. $\Delta \lambda$ is determined depending on the width, shape, etc. of the spectrum of the selected optical signal. Furthermore, the first and second wavelengths are calculated in advance with respect to, for example, the center wavelength of the selected optical signal.

After the passband of the wavelength tunable filter 104 is configured in S7 through S9, the power detection unit 121 detects the power of the selected optical signal filtered by the wavelength tunable filter 104.

In S10, the path ID signal detection unit 124 generates a bit sequence indicating the change of the power of the selected optical signal filtered by the wavelength tunable filter 104 using the detection result of the power detection unit 121. Then, the path ID signal detection unit 124 detects the header from the generated bit sequence, and acquires the path ID from the payload area succeeding the header.

When the passband of the wavelength tunable filter 104 is allocated on the short wavelength side with respect to the center wavelength of the selected optical signal, the logic of each bit of the bit sequence generated based on the change of the power of the selected optical signal is inverted. Therefore, when the passband of the wavelength tunable filter 104 is allocated on the short wavelength side with respect to the center wavelength of the selected optical signal, the path ID signal detection unit 124 regenerates the path ID signal by inverting the logic of each bit of the generated bit sequence.

As described above, in the first embodiment, the state of the optical transmission path through which the selected optical signal is transmitted is decided. That is, the offset direction of the multistage WSS passband with respect to the center wavelength of the selected optical signal is decided. Then, the filter control unit 113 allocates the passband of the wavelength tunable filter 104 so that the offset direction of the multistage WSS passband may match the offset direction of the passband of the wavelength tunable filter 104. Therefore, the intensity modulated component generated by the wavelength tunable filter 104 is not attenuated by the intensity modulated component generated by the multistage WSS passband. As a result, the detection sensitivity of the path ID signal is improved. Otherwise, the deterioration of the detection sensitivity of the path ID signal may be avoided.

Second Embodiment

Figure 13:
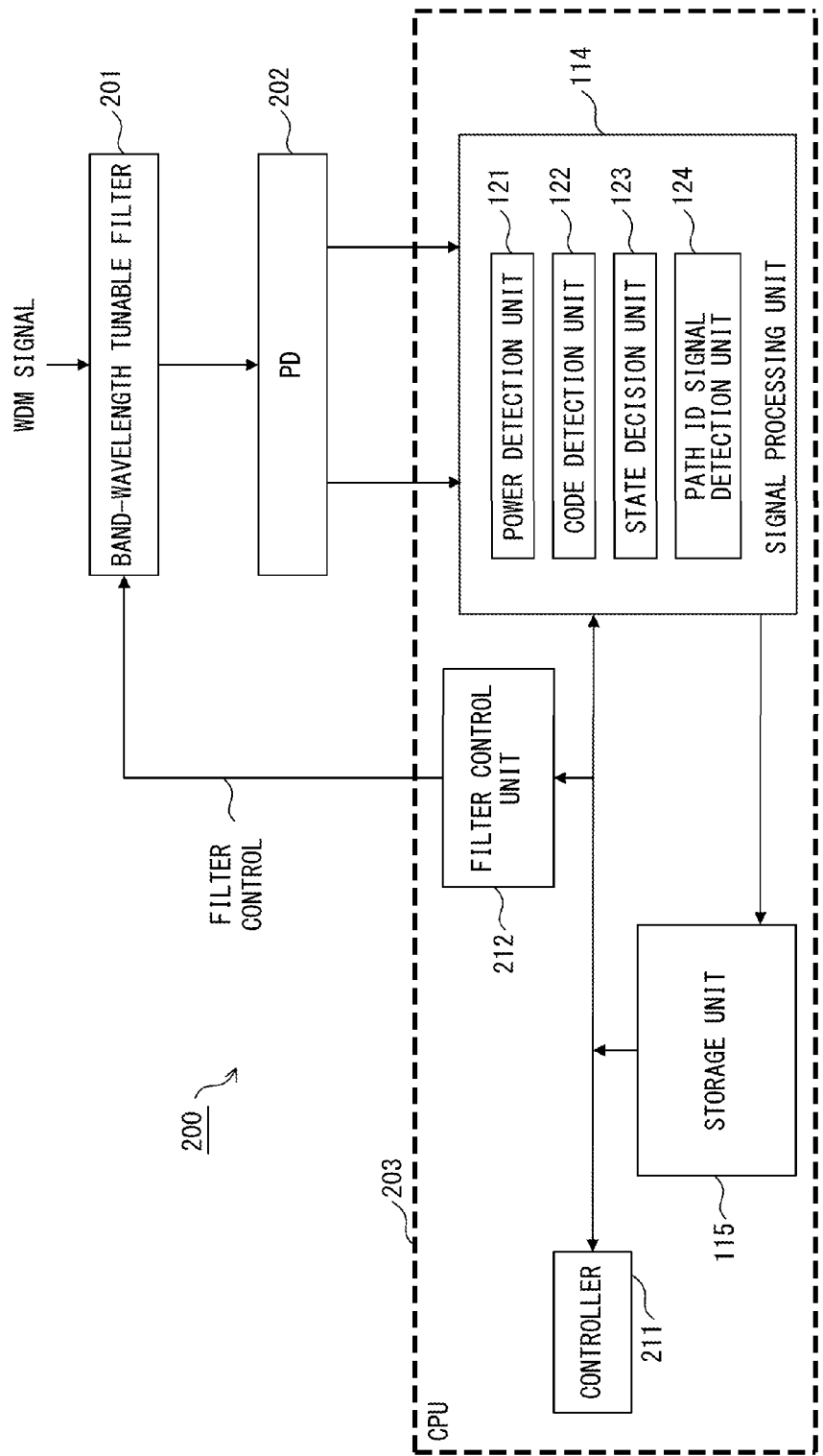
FIG. 13 illustrates a configuration of an FSK signal detection circuit according to the second embodiment.

FIG. 13 illustrates a configuration of an FSK signal detection circuit according to the second embodiment of the present invention. An FSK signal detection circuit 200 according to the second embodiment is also provided in the optical transmission device which transmits a WDM signal as with the first embodiment. For example, the FSK signal detection circuit 200 is provided for the WDM transmission devices 2 through 5 illustrated in FIG. 1. Furthermore, the FSK signal detection circuit 200 may be provided in the reconfigurable optical add/drop multiplexers 6 through 8 and the photonic cross connect 9 illustrated in FIG. 1.

The FSK signal detection circuit 200 includes a band-wavelength tunable filter 201, a photo detector (PD) 202, and a CPU 203, as illustrated in FIG. 13. The WDM signal is input to the FSK signal detection circuit 200.

The band-wavelength tunable filter 201 filters the input WDM signal according to the filter control signal provided by the CPU 203. The photo detector 202 converts the optical signal output from the band-wavelength tunable filter 201 into an electric signal. The photo detector 202 is realized by a low-speed photodiode as with the photo detectors 103 and 105 in the first embodiment.

The CPU 203 includes a controller 211, a filter control unit 212, the signal processing unit 114, and the storage unit 115. The CPU 203 includes, for example, a processor element and memory. However, a part of the process of the CPU 203 may be realized by a hardware circuit.

The controller 211 controls the filter control unit 212 and the signal processing unit 114 in the process of detecting a path ID signal. The filter control unit 212 generates a filter control signal according to an instruction from the controller 211 or the signal processing unit 114. The filter control signal may specify a passband of the band-wavelength tunable filter 201 and the center wavelength of the passband. Since the signal processing unit 114 and the storage unit 115 are substantially the same as those in the first and second embodiments, the explanation is omitted here.

Figure 14:
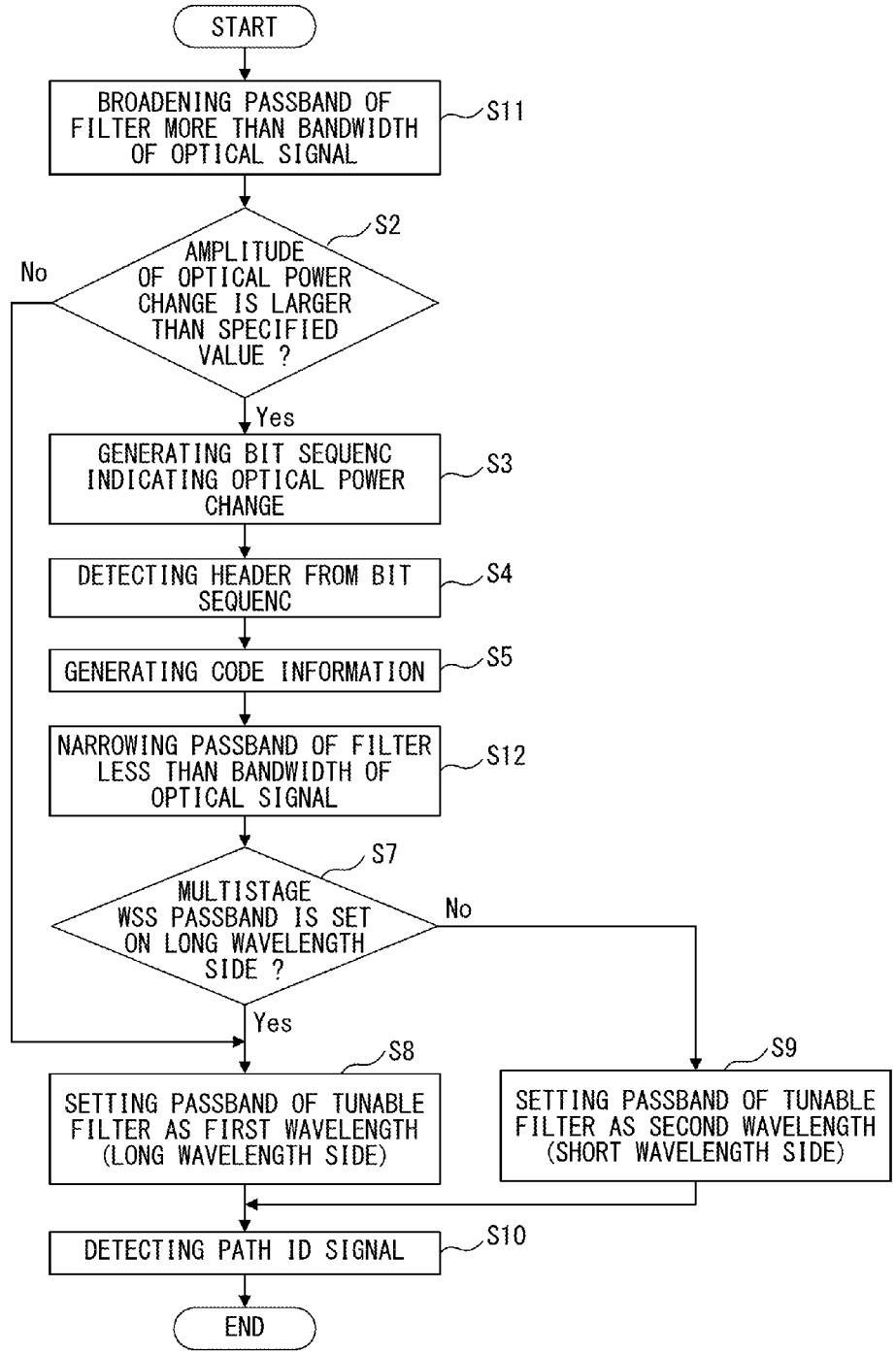
FIG. 14 is a flowchart of an operation of the FSK signal detection circuit according to the second embodiment.

The method of detecting the FSK signal superimposed on the optical signal (that is, a path ID signal) is almost the same in the first and second embodiments. However, the configuration and the operation of generating a selected optical signal from an input WDM signal are different between the first and second embodiments. The operation of the FSK signal detection circuit 200 according to the second embodiment is explained below with reference to the flowchart illustrated in FIG. 14.

In S11, the controller 211 issues an instruction to start detecting an FSK signal to the filter control unit 212 and the signal processing unit 114. Upon receipt of the instruction, the filter control unit 212 generates a filter control signal to select a specified optical signal from the input WDM signal (that is, a selected optical signal). The filter control signal includes an instruction to broaden the passband of the band-wavelength tunable filter 201 more than the bandwidth of the selected optical signal. Then, the band-wavelength tunable filter 201 broadens the passband according to the filter control signal. Therefore, the power detection unit 121 detects the power of the selected optical signal. That is, the power of the entire spectrum of the selected optical signal is detected.

The processes in S2-S5 are substantially the same as those in the first and second embodiments. That is, the code information indicating whether the multistage WSS passband for the selected optical signal is formed on the long wavelength side or the short wavelength side with respect to the center wavelength of the selected optical signal is generated.

In S12, the filter control unit 212 generates a filter control signal for converting a frequency modulated signal superimposed on the selected optical signal (that is, a path ID signal) into an intensity modulated signal. The filter control signal includes an instruction to narrow the passband of the band-wavelength tunable filter 201 as compared with the bandwidth of the selected optical signal. Then, upon receipt of the filter control signal, the band-wavelength tunable filter 201 narrows the passband. In this case, a width of the passband of the band-wavelength tunable filter 201 is the same as, for example, the width of the passband of the wavelength tunable filter 104 in the first embodiment.

The processes in S7-S9 are substantially the same between the first and second embodiments. That is, according to the code information generated in S5, the wavelength of the passband of the band-wavelength tunable filter 201 is controlled. For example, according to the code information, the passband L or the passband S illustrated in FIG. 12 is allocated. Afterwards, in S10, a path ID signal detection unit 214 detects a path ID signal, and acquires a path ID.

Thus, also in the second embodiment, the passband of the band-wavelength tunable filter 201 is allocated so that the offset direction of the multistage WSS passband may match the offset direction of the passband of the band-wavelength tunable filter 201. Therefore, as with the first embodiment, the detection sensitivity of the path ID signal is improved in the second embodiment.

Third Embodiment

In the first and second embodiments, the wavelength of the passband of the optical filter in a receiver is controlled depending on the offset direction of the multistage WSS passband with respect to the center wavelength of the optical signal as described above. On the other hand, in the third embodiment, the carrier wavelength of an optical signal is controlled depending on the offset direction of the multistage WSS passband with respect to the center wavelength of an optical signal.

FIG. 15 illustrates an example a configuration of an optical transmission system according to the third embodiment of the present invention. The optical transmission system includes a WDM transmission device 50, a plurality of ROADM nodes 60a through 60n, and a network management system 70. The FSK signal detection circuit 100 according to the first embodiment is connected to the ROADM node 60n. However, the FSK signal detection circuit 100 may be implemented in the ROADM node 60n.

The WDM transmission device 50 includes an optical transmitter 51 and a wavelength control unit 52. The optical transmitter 51 generates an optical signal which transmits a data signal. The optical transmitter 51 may superimpose a path ID signal on the optical signal by a frequency modulation format. Therefore, the optical transmitter 51 may be realized by the configuration illustrated in, for example, FIG. 4A or 4B. The wavelength control unit 52 controls the carrier wavelength of an optical signal generated by the optical transmitter 51 according to the instruction from the network management system 70. For example, when the optical transmitter 51 is realized by the configuration illustrated in FIG. 4B, the wavelength control unit 52 may adjust the wavelength of the laser light source 39. The WDM transmission device 50 includes a plurality of optical transmitters 51 although they are not illustrated in FIG. 15. The WDM transmission device 50 transmits a WDM signal on which a plurality of optical signals generated by the plurality of optical transmitters 51 are multiplexed.

The ROADM nodes 60a through 60n respectively transmit the WDM signal according to the instruction from the network management system 70. Each of the ROADM nodes 60a through 60n includes a wavelength selective switch (WSS). Therefore, when an optical signal of a certain wavelength is transmitted to a receiver node connected to the ROADM node 60n from the WDM transmission device 50, the optical signal passes through the wavelength selective switch of each of the ROADM nodes 60a through 60n. Therefore, when there are a large number of ROADM nodes 60a through 60n, passband narrowing caused by the multistage WSS passband may occur.

In the optical transmission system, the FSK signal detection circuit 100 detects the FSK signal superimposed on the specifies optical signal (that is, a path ID signal). The detection of a signal in the third embodiment is described below with reference to the flowchart illustrated in FIG. 16.

In S21, the ROADM node 60n branches the optical signal specified by the network management system 70 (hereafter referred to as a selected optical signal) and guides it to the FSK signal detection circuit 100. In this case, the selected optical signal is branched from the received WDM signal by the wavelength selective switch implemented in the ROADM node 60n. Therefore, the FSK signal detection circuit 100 does not need to include the wavelength selective switch 101 illustrated in FIG. 10. It is assumed that the selected optical signal is generated by the optical transmitter 51 in the WDM transmission device 50. A path ID signal is superimposed in the frequency modulation format on the selected optical signal.

In S22 and S23, the CPU 106 generates the code information based on the change of the power of the selected optical signal as with the process according to the first embodiment illustrated in FIG. 11. The code information indicates whether or not the header of the path ID signal detected in the FSK signal detection circuit 100 is inverted. That is, the code information indicates the offset direction of the multistage WSS passband with respect to the center wavelength of the selected optical signal.

In S24, the network management system 70 acquires the code information generated by the CPU 106. Next, the network management system 70 issues in S25 an instruction to adjust a carrier wavelength according to the code information to the wavelength control unit 52 in the WDM transmission device 50. For example, when the header detected in the FSK signal detection circuit 100 is not inverted, the network management system 70 issues an instruction to maintain the carrier wavelength to the wavelength control unit 52. In this case, the optical transmitter 51 transmits an optical signal without changing the carrier wavelength. On the other hand, if the header detected in the FSK signal detection circuit 100 is inverted, the network management system 70 issues an instruction to shift the carrier wavelength to the wavelength control unit 52. Then, the wavelength control unit 52 shifts the transmission wavelength of the optical transmitter 51 according to the instruction from the network management system 70. Then, the optical transmitter 51 transmits an optical signal whose wavelength has been shifted. In this case, for example, the carrier wavelength is adjusted so that the header which is not inverted may be detected in the FSK signal detection circuit 100. Otherwise, the carrier wavelength may be adjusted so that an intensity modulated component may be sufficiently decreased in the FSK signal detection circuit 100 (that is, the offset of the multistage WSS passband may be substantially zero).

In S26, the 1×2 optical switch 102 in the FSK signal detection circuit 100 selects the selected optical signal. Thus, the selected optical signal is afterward guided to the wavelength tunable filter 104. In S27, the CPU 106 allocates the passband of the wavelength tunable filter 104 according to the code information. For example, when the header detected in the FSK signal detection circuit 100 is not inverted, the CPU 106 allocates the passband of the wavelength tunable filter 104 at a default wavelength. The default wavelength is, for example, the first wavelength illustrated in FIG. 12. On the other hand, if the header detected in the FSK signal detection circuit 100 is inverted, the CPU 106 allocates the passband of the wavelength tunable filter 104 at the wavelength shifted by a specified amount from the default wavelength. The amount of wavelength shift may be the same as the amount of shift of a carrier wavelength in the optical transmitter 51. Then, in S28, the CPU 106 detects the path ID signal based on the change of the power of the selected optical signal filtered by the wavelength tunable filter 104.

Fourth Embodiment

FIG. 17 illustrates an example of a configuration of an optical transmission system according to the fourth embodiment of the present invention. Also in the fourth embodiment, as with the third embodiment, the carrier wavelength of the optical signal is controlled depending on the offset direction of the multistage WSS passband with respect to the center wavelength of the optical signal. In the optical transmission system according to the third embodiment, the FSK signal detection circuit 100 according to the first embodiment is used. However, in the optical transmission system according to the fourth embodiment, the FSK signal detection circuit 200 according to the second embodiment is used.

The band-wavelength tunable filter 201 of the FSK signal detection circuit 200 may select an optical signal of a desired wavelength as explained above with reference to FIG. 13. Therefore, in the optical transmission system illustrated in FIG. 17, the WDM signal which may be branched on the input side of the ROADM node 60n and guided to the FSK signal detection circuit 200.

Figure 16:
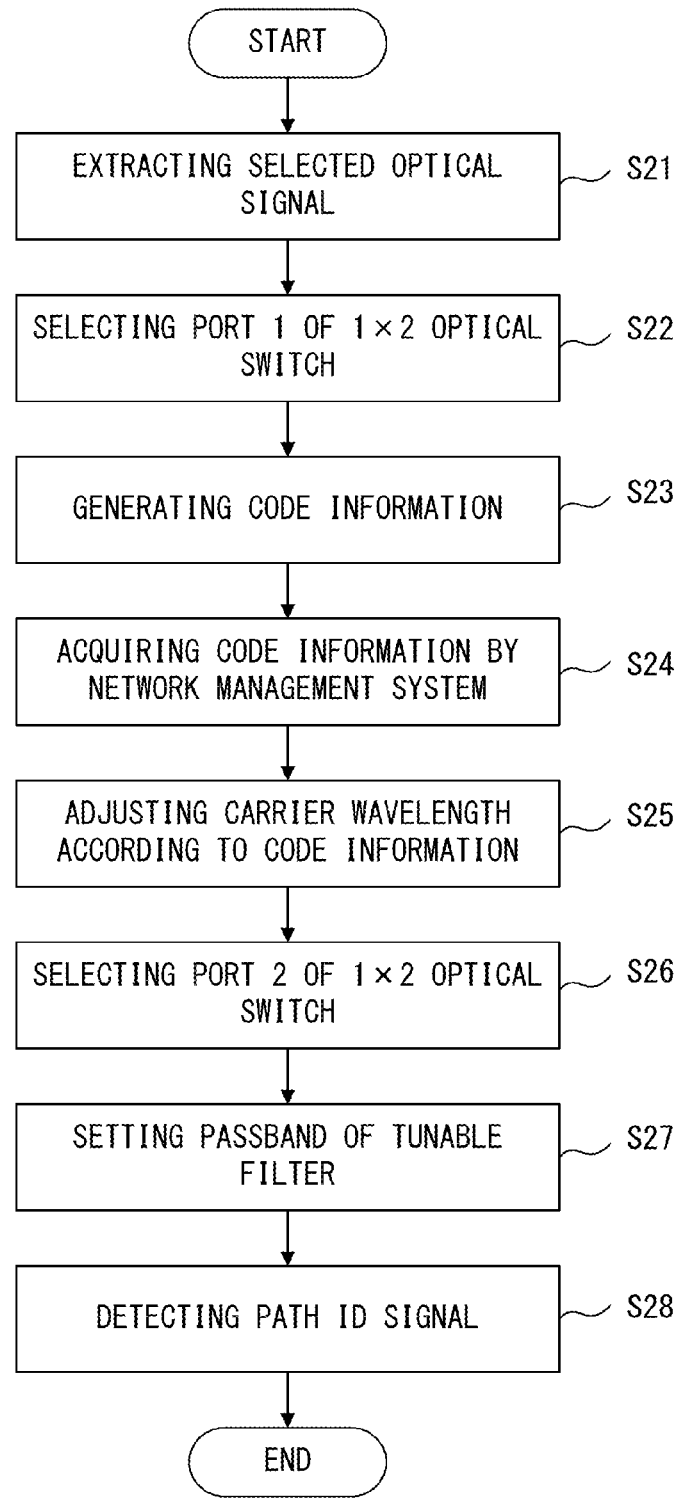
FIG. 16 is a flowchart of detecting an FSK signal according to the third embodiment.
Figure 18:
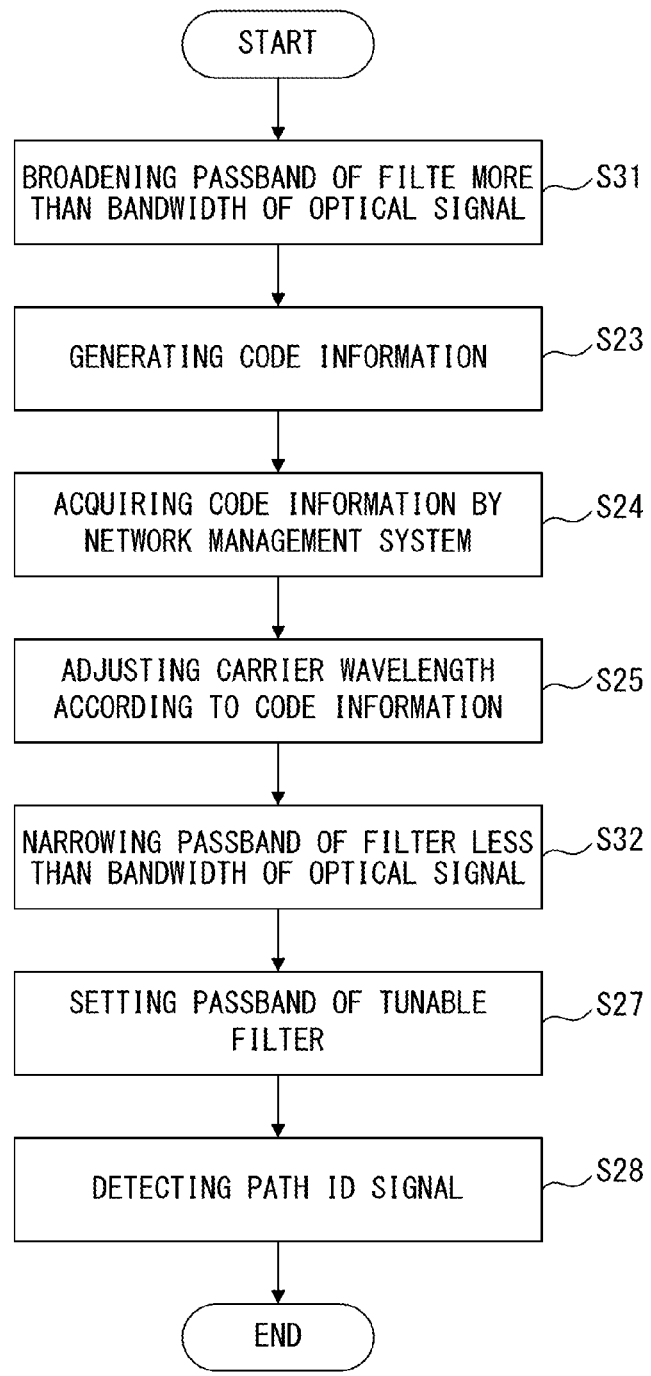
FIG. 18 is a flowchart of detecting an FSK signal according to the fourth embodiment.

FIG. 18 is a flowchart of detecting an FSK signal according to the fourth embodiment. In this example, the flowchart according to the third embodiment illustrated in FIG. 16 is similar to the flowchart according to the fourth embodiment illustrated in FIG. 18. However, in the fourth embodiment, the process in S21 is omitted. Furthermore, instead of S22 and S26 according to the third embodiment, the processes in S31 and S32 are performed. The processes in S31 and S32 are substantially the same as the processes in S11 and S12 respectively. That is, the CPU 203 controls the passband of the band-wavelength tunable filter 201.

Other Embodiments

In the first through fourth embodiments, the FSK signal detection circuits 100 and 200 monitor the change of the power of a selected optical signal. The change of the power of the selected optical signal indicates the state of the optical transmission path through which the selected optical signal is transmitted. For example, when the change of the power of the selected optical signal is sufficiently small, it indicates the state in which passband narrowing does not occur in the optical transmission path, or the state in which the offset of the multistage WSS passband with respect to the center wavelength of the selected optical signal is substantially zero. That is, the amplitude of the change of the power of the selected optical signal indicates the amount of offset of the multistage WSS passband with respect to the center wavelength of the selected optical signal. Furthermore, the code of the bit sequence of the intensity modulated signal detected based on the change of the power of the selected optical signal indicates the offset direction of the multistage WSS passband with respect to the center wavelength of the selected optical signal. Therefore, the FSK signal detection circuits 100 and 200 may estimate the state of the optical transmission path (including the ROADM node etc.) through which the selected optical signal is transmitted.

In addition, in the first and second embodiments, the offset direction of the multistage WSS passband with respect to the center wavelength of the selected optical signal is detected, and the passband of the optical filter (the wavelength tunable filter 104, the band-wavelength tunable filter 201) is controlled based on the detection result. However, the present invention is not limited to this configuration. For example, the FSK signal detection circuit provides the passband which passes a part of the components on the long wavelength side of the spectrum of the selected optical signal (the passband L in the example illustrated in FIG. 12), and the passband which passes apart of the components on the short wavelength side of the spectrum of the selected optical signal (the passband S in the example illustrated in FIG. 12). The passbands L and S may be realized by two optical filters, and may be realized by controlling the wavelength of the passband of one optical filter.

In this case, if the multistage WSS passband is formed on the long wavelength side of the center wavelength of the selected optical signal, the amplitude of the intensity modulated signal generated from the output optical signal of the passband L is larger than the amplitude of the intensity modulated signal generated from the output optical signal of the passband S. On the other hand, if the multistage WSS passband is formed on the short wavelength side of the center wavelength of the selected optical signal, the amplitude of the intensity modulated signal generated from the output optical signal of the passband S is larger than the amplitude of the intensity modulated signal generated from the output optical signal of the passband L. Therefore, the FSK signal detection circuit detects the FSK signal using the output optical signal of the passband having a larger amplitude of the intensity modulated signal. With the configuration, the detection sensitivity of the FSK signal is improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A frequency modulated signal detection circuit that receives an optical signal on which a frequency modulated signal is superimposed, the frequency modulated signal detection circuit comprising:

an optical filter configured to filter the optical signal;
a filter controller configured to control a passband of the optical filter based on a change of power of the optical signal;
a signal detection unit configured to detect the frequency modulated signal based on the change of the power of the optical signal filtered by the optical filter; and
a state decision unit configured to decide a state of an optical transmission path through which the optical signal is transmitted based on the change of the power of the optical signal, wherein
the state decision unit decides whether the passband of the optical transmission path for the optical signal is shifted to a long wavelength side or a short wavelength side with respect to a center wavelength of the optical signal, and
when the passband of the optical transmission path is shifted to the long wavelength side, the filter controller allocates the passband of the optical filter on the long wavelength side of the center wavelength of the optical signal, and when the passband of the optical transmission path is shifted to the short wavelength side, the filter controller allocates the passband of the optical filter on the short wavelength side of the center wavelength of the optical signal.

2. A frequency modulated signal detection circuit that receives an optical signal on which a frequency modulated signal is superimposed, the frequency modulated signal including a specified data pattern, the frequency modulated signal detection circuit comprising:

an optical filter configured to filter the optical signal;
a filter controller configured to control a passband of the optical filter based on a change of power of the optical signal;
a signal detection unit configured to detect the frequency modulated signal based on the change of the power of the optical signal filtered by the optical filter; and
a state decision unit that generates code information indicating whether a logic of the specified data pattern detected based on the change of the power of the optical signal is inverted, wherein
the filter controller allocates the passband of the optical filter on a long wavelength side or a short wavelength side with respect to a center wavelength of the optical signal according to the code information generated by the state decision unit.

3. The frequency modulated signal detection circuit according to claim 2, further comprising a wavelength selective switch configured to select an optical signal of a specified wavelength specified from a WDM signal, wherein
the state decision unit generates the code information based on a change of power of the selected optical signal that is selected by the wavelength selective switch;
the filter controller allocates the passband of the optical filter for the selected optical signal according to the code information.

4. The frequency modulated signal detection circuit according to claim 2, wherein when the passband of the optical filter is controlled so that an optical signal of a specified wavelength is extracted from a WDM signal, the state decision unit generates the code information based on a change of power of an optical signal that passes through the optical filter, and
the filter controller allocates the passband of the optical filter according to the code information generated by the state decision unit when the passband of the optical filter is controlled so that an optical signal of the specified wavelength is extracted from the WDM signal.

5. An optical transmission system comprising:
a first transmission device configured to transmit an optical signal; and
a second transmission device configured to receive the optical signal, wherein
the first transmission device includes:
   an optical transmitter that superimposes a frequency modulated signal on the optical signal and transmits the optical signal; and
   a wavelength control unit that controls a wavelength of the optical signal,
the second transmission device includes a state decision unit that decides a state of an optical transmission path between the first and second transmission devices based on a change of power of the optical signal and wherein;
the wavelength control unit controls the wavelength of the optical signal based on the state of the optical transmission path decided by the state decision unit.

6. A frequency modulated signal detection circuit that receives an optical signal on which a frequency modulated signal is superimposed, the frequency modulated signal detection circuit comprising:
an optical filter configured to provide a first passband that passes a part of a component of a spectrum of the optical signal on a long wavelength side with respect to a center wavelength of the optical signal, and a second passband that passes a part of a component of the spectrum of the optical signal on a short wavelength side with respect to the center wavelength of the optical signal; and
a signal detection unit that detects the frequency modulated signal based on a change of power of output light of the second passband when a change of power of output light of the second passband is larger than a change of power of output light of the first passband, and detects the frequency modulated signal based on a change of power of output light of the first passband when a change of power of output light of the second passband is smaller than a change of power of output light of the first passband.

* * * * *